United States Patent
Lee et al.

(10) Patent No.: US 10,096,087 B2
(45) Date of Patent: Oct. 9, 2018

(54) APPARATUS AND METHOD OF PROCESSING MAGNETIC RESONANCE (MR) IMAGES

(71) Applicant: Samsung Electronics Co., Ltd, Gyeonggi-do (KR)

(72) Inventors: Jun-ki Lee, Seoul (KR); Jun-sung Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 78 days.

(21) Appl. No.: 15/253,854

(22) Filed: Aug. 31, 2016

(65) Prior Publication Data

US 2017/0061588 A1 Mar. 2, 2017

(30) Foreign Application Priority Data

Aug. 31, 2015 (KR) ........................ 10-2015-0123205

(51) Int. Cl.
*G06K 9/00* (2006.01)
*G06T 5/00* (2006.01)
(Continued)

(52) U.S. Cl.
CPC ............... *G06T 5/001* (2013.01); *G06T 5/50* (2013.01); *G06T 7/248* (2017.01);
(Continued)

(58) Field of Classification Search
CPC ........... G06T 5/001; G06T 7/248; G06T 5/50; G06T 7/20; G06T 2207/20201
(Continued)

(56) References Cited

U.S. PATENT DOCUMENTS

| 7,787,927 B2 | 8/2010 | Wood et al. |
| 2008/0231271 A1* | 9/2008 | Yui .................. G01R 33/5614 |
| | | 324/307 |

(Continued)

FOREIGN PATENT DOCUMENTS

| KR | 20140008623 A | 1/2014 |
| KR | 20140120860 A | 10/2014 |

OTHER PUBLICATIONS

Theodore R. Steger, et al., "Real-time Motion Detection of Functional MRI Data", Journal of Applied Clinical Medical Physics, vol. 5, No. 2, 2004, 8 pages.

(Continued)

*Primary Examiner* — Van D Huynh

(57) ABSTRACT

Provided is an apparatus for processing a magnetic resonance (MR) image, including: an image acquisition unit configured to acquire a plurality of MR images by performing MR imaging on a moving object during temporally consecutive time intervals; a controller configured to sequentially compare two adjacent MR images from among the plurality of MR images to thereby detect an interval during which motion occurs; an image processor configured to calculate a transformation matrix for performing motion correction on at least one MR image corresponding to the detected interval and obtain a motion-corrected MR image by applying the transformation matrix to the at least one MR image; and an output unit configured to display the motion-corrected MR image.

20 Claims, 12 Drawing Sheets

(51) Int. Cl.
*G06T 5/50* (2006.01)
*G06T 7/246* (2017.01)

(52) U.S. Cl.
CPC ............... *G06T 2200/04* (2013.01); *G06T 2207/10088* (2013.01); *G06T 2207/30016* (2013.01)

(58) Field of Classification Search
USPC ........................................ 382/131
See application file for complete search history.

(56) References Cited

U.S. PATENT DOCUMENTS

| | | | |
|---|---|---|---|
| 2009/0087057 A1* | 4/2009 | Parker | G01R 33/56509 |
| | | | 382/131 |
| 2013/0119985 A1 | 5/2013 | Lin et al. | |
| 2015/0015691 A1 | 1/2015 | Forman et al. | |
| 2016/0180553 A1* | 6/2016 | Edic | A61B 6/032 |
| | | | 382/107 |
| 2017/0049420 A1* | 2/2017 | Shikama | A61B 8/5276 |
| 2017/0196528 A1* | 7/2017 | Kim | A61B 6/5205 |

OTHER PUBLICATIONS

Wollny, G., et al., "Exploiting Quasiperiodicity in Motion Correction of Free-Breathing Myocardial Perfusion MRI," IEEE Transactions on Medical Imaging, vol. 29, No. 8, Aug. 2010, pp. 1516-1527.
Foreign Communication From a Related Counterpart Application, Korean Application No. 10-2015-0123205, "Notice of Allowance" Dec. 1, 2016, 2 pages.

* cited by examiner

APPARATUS AND METHOD OF PROCESSING MAGNETIC RESONANCE (MR) IMAGES

CROSS-REFERENCE TO RELATED APPLICATION(S) AND CLAIM OF PRIORITY

The present application is related to and claims the benefit of Korean Patent Application No. 10-2015-0123205, filed on Aug. 31, 2015, in the Korean Intellectual Property Office, the disclosure of which is incorporated herein in its entirety by reference.

TECHNICAL FIELD

The present disclosure relates to methods and apparatuses for processing medical images, and more particularly, to methods and apparatuses for processing a medical image so that a user may easily determine and diagnose a patient's disease by using a plurality of medical images.

BACKGROUND

Medical imaging apparatuses are used to acquire images showing an internal structure of an object. The medical imaging apparatuses are non-invasive examination apparatuses that capture and process images of details of structures, tissue, fluid flow, etc., inside a body and provide the images to a user. A user, e.g., a medical practitioner, may use medical images output from the medical imaging apparatuses to diagnose a patient's condition and diseases.

Examples of medical imaging apparatuses may include a magnetic resonance imaging (MRI) apparatus for providing an MR image, a computed tomography (CT) apparatus, an X-ray apparatus, and an ultrasound diagnosis apparatus.

In detail, among medical imaging apparatuses, a CT apparatus is capable of providing a cross-sectional image of an object. Furthermore, the CT apparatus may represent an internal structure (e.g., organs such as a kidney, a lung, etc.) of the object without superimposition of adjacent structures, as compared to a general X-ray apparatus. Due to these advantages, a CT apparatus is widely used for precise diagnosis of diseases.

A CT apparatus emits X-rays towards an object, detects X-rays that have passed through the object, and reconstructs an image by using the detected X-rays.

Furthermore, an MM apparatus uses a magnetic field to capture an image of a target object. The MM apparatus is widely used for the accurate diagnosis of diseases because stereoscopic images of bones, lumbar discs, joints, nerve ligaments, etc. can be obtained at desired angles.

The MM apparatus uses a radio frequency (RF) multi-coil including a plurality of RF coils, a permanent magnet, gradient coils, etc. to acquire MR signals, and reconstructs an MR image by sampling the acquired MR signals.

As described above, medical images obtained by various medical imaging apparatuses represent an object in different ways according to the type of a medical imaging apparatus and a scanning method used.

A doctor may analyze a medical image to determine the presence of disease or abnormal health conditions in a patient. Accordingly, it may be necessary to provide an apparatus and method of processing an image to generate a diagnostic image so that a user, e.g., a medical practitioner, may easily observe or diagnose a patient's disease.

SUMMARY

To address the above-discussed deficiencies, it is a primary object to provide methods and apparatuses for processing a magnetic resonance (MR) image, which facilitate observation or diagnosis of a patient's disease by a user.

Provided are methods and apparatuses for processing a plurality of MR images so that the user easily determines a user's disease status when patient motion occurs in a discontinuous manner during MR imaging.

Provided are methods and apparatuses for processing an MR image, whereby unnecessary computations may be eliminated and the total processing time may be reduced by performing motion correction on only an MR image, corresponding to an interval during which motion is detected, from among a plurality of temporally consecutive MR images.

Additional aspects will be set forth in part in the description which follows and, in part, will be apparent from the description, or may be learned by practice of the presented embodiments.

According to an aspect of an embodiment, an apparatus for processing an MR image includes: an image acquisition unit configured to acquire a plurality of MR images by performing MR imaging on a moving object during temporally consecutive time intervals; a controller configured to sequentially compare two adjacent MR images from among the plurality of MR images to thereby detect an interval during which motion occurs; an image processor configured to calculate a transformation matrix for performing motion correction on at least one MR image corresponding to the detected interval and obtain a motion-corrected MR image by applying the transformation matrix to the at least one MR image; and an output unit configured to display the motion-corrected MR image.

The image processor is further configured to obtain the motion-corrected MR image by performing image registration on two adjacent MR images corresponding to the detected interval from among the plurality of MR images.

The controller is further configured to detect the motion by using a similarity measure between the two adjacent MR images.

The similarity measure may be calculated for at least one of a predetermined volume region, a predetermined planar interval, a predetermined linear interval, or a predetermined point in each of the two adjacent MR images.

The controller is further configured to calculate a difference between centers of mass or centers of intensity of the two adjacent MR images and detect the motion based on whether the difference exceeds a predetermined reference value.

The image processor is further configured to set, when a first interval and a second interval that is subsequent to the first interval are detected as intervals in which the motion occurs, a plurality of MR images corresponding to the first and second intervals as transformation interval images.

The image processor is further configured to obtain the motion-corrected MR image by calculating a same transformation matrix with respect to each of all MR images within the transformation interval images and applying the same transformation matrix to all the MR images, and the transformation matrix may be an operation formula for image registration between a reference MR image and a first MR image that is in the transformation interval images.

The image processor is further configured to set an image interval, excluding intervals including the transformation interval images from among a plurality of MR images, as a motion free interval.

The image processor is further configured not to perform the motion correction on an MR image within the motion free interval.

The apparatus may further include a user input unit configured to receive a user input for selecting the reference MR image from among the plurality of MR images.

The output unit is further configured to display at least one of the detected interval and a time point corresponding to an image on which image registration has been performed.

According to an aspect of another embodiment, a method of processing an MR image includes: acquiring a plurality of MR images by performing MR imaging on a moving object during temporally consecutive time intervals; sequentially comparing two adjacent MR images from among the plurality of MR images to thereby detect an interval during which motion occurs; calculating a transformation matrix for performing motion correction on at least one MR image corresponding to the detected interval; obtaining a motion-corrected MR image by applying the transformation matrix to the at least one MR image; and displaying the motion-corrected MR image.

The obtaining of the motion-corrected MR image may include obtaining the motion-corrected MR image by performing image registration on two adjacent MR images corresponding to the detected interval from among the plurality of MR images.

The detecting of the interval during which the motion occurs may include detecting the motion by using a similarity measure between the two adjacent MR images.

The similarity measure may be calculated for at least one of a predetermined volume region, a predetermined planar interval, a predetermined linear interval, or a predetermined point in each of the two adjacent MR images.

The detecting of the interval during which the motion occurs may include calculating a difference between centers of mass or centers of intensity of the two adjacent MR images and detecting the motion based on whether the difference exceeds a predetermined reference value.

The obtaining of the motion-corrected MR image may include setting, when a first interval and a second interval that is subsequent to the first interval are detected as intervals in which the motion occurs, a plurality of MR images corresponding to the first and second intervals as transformation interval images.

The obtaining of the motion-corrected MR image may include obtaining the motion-corrected MR image by calculating a same transformation matrix with respect to each of all MR images within the transformation interval images and applying the same transformation matrix to all the MR images, and the transformation matrix may be an operation formula for image registration between a reference MR image and a first MR image that is in the transformation interval images.

The obtaining of the motion-corrected MR image may include setting an image interval, excluding intervals including the transformation interval images from among a plurality of MR images, as a motion free interval.

In the obtaining of the motion-corrected MR image, the motion correction may not be performed on an MR image within the motion free interval.

The method may further include receiving a user input for selecting the reference MR image from among the plurality of MR images.

The method may further include displaying at least one of the detected interval and a time point corresponding to an image on which image registration has been performed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
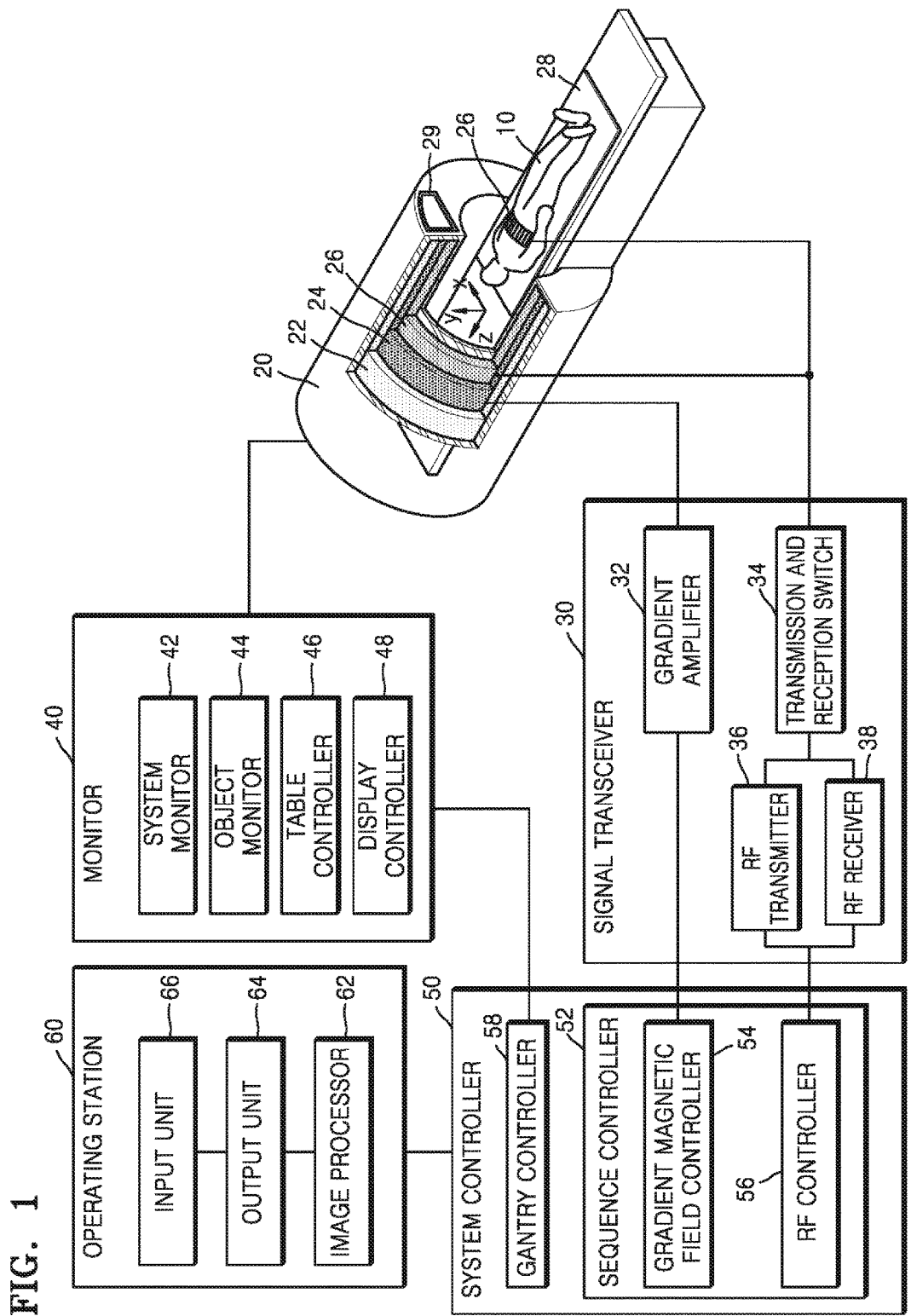
FIG. 1 is a block diagram of a general magnetic resonance imaging (MRI) system.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The attached drawings for illustrating embodiments of the present disclosure are referred to in order to gain a sufficient understanding of the present disclosure, the merits thereof, and the objectives accomplished by the implementation of the present disclosure. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art, and the present disclosure will only be defined by the appended claims.

Hereinafter, the terms used in the specification will be briefly described, and then the present disclosure will be described in detail.

The terms used in this specification are those general terms currently widely used in the art in consideration of functions regarding the present disclosure, but the terms may vary according to the intention of those of ordinary skill in the art, precedents, or new technology in the art. Also, some terms may be arbitrarily selected by the applicant, and in this case, the meaning of the selected terms will be described in detail in the detailed description of the present specification. Thus, the terms used in the specification should be understood not as simple names but based on the meaning of the terms and the overall description of the disclosure.

When a part "includes" or "comprises" an element, unless there is a particular description contrary thereto, the part can further include other elements, not excluding the other elements. Also, the term "unit" in the embodiments of the present disclosure means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Reference will now be made in detail to embodiments, examples of which are illustrated in the accompanying drawings. In the following description, well-known functions or constructions are not described in detail so as not to obscure the embodiments with unnecessary detail. Expressions such as "at least one of," when preceding a list of elements, modify the entire list of elements and do not modify the individual elements of the list.

Throughout the specification, an "image" may denote multi-dimensional data composed of discrete image elements (for example, pixels in a two-dimensional image and voxels in a three-dimensional image). For example, the image may be a medical image of an object captured by an X-ray apparatus, a computed tomography (CT) apparatus, a magnetic resonance imaging (MRI) apparatus, an ultrasound diagnosis apparatus, or another medical imaging apparatus.

Furthermore, in the present specification, an "object" may be a human, an animal, or a part of a human or animal. For example, the object may be an organ (e.g., the liver, the heart, the womb, the brain, a breast, or the abdomen), a blood vessel, or a combination thereof. Furthermore, the "object" may be a phantom. The phantom means a material having a density, an effective atomic number, and a volume that are approximately the same as those of an organism. For example, the phantom may be a spherical phantom having properties similar to the human body.

Furthermore, in the present specification, a "user" may be, but is not limited to, a medical expert, such as a medical doctor, a nurse, a medical laboratory technologist, or a technician who repairs a medical apparatus.

Furthermore, in the present specification, an "MR image" refers to an image of an object obtained by using the nuclear magnetic resonance principle.

Furthermore, in the present specification, a "pulse sequence" refers to continuity of signals repeatedly applied by an MRI apparatus. The pulse sequence may include a time parameter of a radio frequency (RF) pulse, for example, repetition time (TR) or echo time (TE).

Furthermore, in the present specification, a "pulse sequence schematic diagram" shows an order of events that occur in an MRI apparatus. For example, the pulse sequence schematic diagram may be a diagram showing an RF pulse, a gradient magnetic field, an MR signal, or the like according to time.

An MRI system is an apparatus for acquiring a sectional image of a part of an object by expressing, in a contrast comparison, a strength of a MR signal with respect to a radio frequency (RF) signal generated in a magnetic field having a specific strength. For example, if an RF signal that only resonates a specific atomic nucleus (for example, a hydrogen atomic nucleus) is emitted for an instant toward the object placed in a strong magnetic field and then such emission stops, an MR signal is emitted from the specific atomic nucleus, and thus the MRI system may receive the MR signal and acquire an MR image. The MR signal denotes an RF signal emitted from the object. An intensity of the MR signal may be determined according to a density of a predetermined atom (for example, hydrogen) of the object, a relaxation time T1, a relaxation time T2, and a flow of blood or the like.

MRI systems include characteristics different from those of other imaging apparatuses. Unlike imaging apparatuses such as CT apparatuses that acquire images according to a direction of detection hardware, MM systems may acquire 2D images or 3D volume images that are oriented toward an optional point. MM systems do not expose objects or examiners to radiation, unlike CT apparatuses, X-ray apparatuses, position emission tomography (PET) apparatuses, and single photon emission CT (SPECT) apparatuses, may acquire images having high soft tissue contrast, and may acquire neurological images, intravascular images, musculoskeletal images, and oncologic images that are required to precisely capturing abnormal tissues.

FIG. 1 is a block diagram of a general MRI system. Referring to FIG. 1, the general MRI system may include a gantry 20, a signal transceiver 30, a monitoring unit 40, a system controller 50, and an operating unit 60.

The gantry 20 prevents external emission of electromagnetic waves generated by a main magnet 22, a gradient coil 24, and an RF coil 26. A magnetostatic field and a gradient magnetic field are formed in a bore in the gantry 20, and an RF signal is emitted toward an object 10.

The main magnet 22, the gradient coil 24, and the RF coil 26 may be arranged in a predetermined direction of the gantry 20. The predetermined direction may be a coaxial cylinder direction. The object 10 may be disposed on a table 28 that is capable of being inserted into a cylinder along a horizontal axis of the cylinder.

The main magnet 22 generates a magnetostatic field or a static magnetic field for aligning magnetic dipole moments of atomic nuclei of the object 10 in a constant direction. A precise and accurate MR image of the object 10 may be obtained due to a magnetic field generated by the main magnet 22 being strong and uniform.

The gradient coil 24 includes X, Y, and Z coils for generating gradient magnetic fields in X-, Y-, and Z-axis directions crossing each other at right angles. The gradient coil 24 may provide location information of each region of the object 10 by differently inducing resonance frequencies according to the regions of the object 10.

The RF coil 26 may emit an RF signal toward a patient and receive an MR signal emitted from the patient. In detail, the RF coil 26 may transmit, toward atomic nuclei included in the patient and having precessional motion, an RF signal having the same frequency as that of the precessional motion, stop transmitting the RF signal, and then receive an MR signal emitted from the atomic nuclei included in the patient.

For example, in order to transit an atomic nucleus from a low energy state to a high energy state, the RF coil 26 may generate and apply an electromagnetic wave signal that is an RF signal corresponding to a type of the atomic nucleus, to the object 10. When the electromagnetic wave signal generated by the RF coil 26 is applied to the atomic nucleus, the atomic nucleus may transit from the low energy state to the high energy state. Then, when electromagnetic waves generated by the RF coil 26 disappear, the atomic nucleus to which the electromagnetic waves were applied transits from the high energy state to the low energy state, thereby emitting electromagnetic waves having a Lamor frequency. In other words, when the applying of the electromagnetic wave signal to the atomic nucleus is stopped, an energy level of the atomic nucleus is changed from a high energy level to a low energy level, and thus the atomic nucleus may emit electromagnetic waves having a Lamor frequency. The RF coil 26 may receive electromagnetic wave signals from atomic nuclei included in the object 10.

The RF coil 26 may be realized as one RF transmitting and receiving coil having both a function of generating electromagnetic waves each having an RF that corresponds to a type of an atomic nucleus and a function of receiving electromagnetic waves emitted from an atomic nucleus. Alternatively, the RF coil 26 may be realized as a transmission RF coil having a function of generating electromagnetic waves each having an RF that corresponds to a type of an atomic nucleus, and a reception RF coil having a function of receiving electromagnetic waves emitted from an atomic nucleus.

The RF coil 26 may be fixed to the gantry 20 or may be detachable. When the RF coil 26 is detachable, the RF coil 26 may be an RF coil for a part of the object, such as a head RF coil, a chest RF coil, a leg RF coil, a neck RF coil, a shoulder RF coil, a wrist RF coil, or an ankle RF coil.

The RF coil 26 may communicate with an external apparatus via wires and/or wirelessly, and may also perform dual tune communication according to a communication frequency band.

The RF coil 26 may be a birdcage coil, a surface coil, or a transverse electromagnetic (TEM) coil according to structures.

The RF coil 26 may be a transmission exclusive coil, a reception exclusive coil, or a transmission and reception coil according to methods of transmitting and receiving an RF signal.

The RF coil 26 may be an RF coil having various numbers of channels, such as 16 channels, 32 channels, 72 channels, and 144 channels.

The gantry 20 may further include a display 29 disposed outside the gantry 20 and a display (not shown) disposed inside the gantry 20. The gantry 20 may provide predetermined information to the user or the object 10 through the display 29 and the display respectively disposed outside and inside the gantry 20.

The signal transceiver 30 may control the gradient magnetic field formed inside the gantry 20, i.e., in the bore, according to a predetermined MR sequence, and control transmission and reception of an RF signal and an MR signal.

The signal transceiver 30 may include a gradient amplifier 32, a transmission and reception switch 34, an RF transmitter 36, and an RF receiver 38.

The gradient amplifier 32 drives the gradient coil 24 included in the gantry 20, and may supply a pulse signal for generating a gradient magnetic field to the gradient coil 24 under the control of a gradient magnetic field controller 54. By controlling the pulse signal supplied from the gradient amplifier 32 to the gradient coil 24, gradient magnetic fields in X-, Y-, and Z-axis directions may be synthesized.

The RF transmitter 36 and the RF receiver 38 may drive the RF coil 26. The RF transmitter 36 may supply an RF pulse in a Lamor frequency to the RF coil 26, and the RF receiver 38 may receive an MR signal received by the RF coil 26.

The transmission and reception switch 34 may adjust transmitting and receiving directions of the RF signal and the MR signal. For example, the transmission and reception switch 34 may emit the RF signal toward the object 10 through the RF coil 26 during a transmission mode, and receive the MR signal from the object 10 through the RF coil 26 during a reception mode. The transmission and reception switch 34 may be controlled by a control signal output by an RF controller 56.

The monitoring unit 40 may monitor or control the gantry 20 or devices mounted on the gantry 20. The monitoring unit 40 may include a system monitoring unit 42, an object monitoring unit 44, a table controller 46, and a display controller 48.

The system monitoring unit 42 may monitor and control a state of the magnetostatic field, a state of the gradient magnetic field, a state of the RF signal, a state of the RF coil 26, a state of the table 28, a state of a device measuring body information of the object 10, a power supply state, a state of a thermal exchanger, and a state of a compressor.

The object monitoring unit 44 monitors a state of the object 10. In detail, the object monitoring unit 44 may include a camera for observing a movement or position of the object 10, a respiration measurer for measuring the respiration of the object 10, an electrocardiogram (ECG) measurer for measuring the electrical activity of the object 10, or a temperature measurer for measuring a temperature of the object 10.

The table controller 46 controls a movement of the table 28 where the object 10 is positioned. The table controller 46 may control the movement of the table 28 according to a sequence control of a system controller 50. For example, during moving imaging of the object 10, the table controller 46 may continuously or discontinuously move the table 28 according to the sequence control of the system controller 50, and thus the object 10 may be photographed in a field of view (FOV) larger than that of the gantry 20.

The display controller 48 controls the display 29 disposed outside the gantry 20 and the display disposed inside the gantry 20. In detail, the display controller 48 may control the display 29 and the display to be on or off, and may control a screen image to be output on the display 29 and the display. Also, when a speaker is located inside or outside the gantry 20, the display controller 48 may control the speaker to be on or off, or may control sound to be output via the speaker.

The system controller 50 may include the sequence controller 52 for controlling a sequence of signals formed in the gantry 20, and a gantry controller 58 for controlling the gantry 20 and the devices mounted on the gantry 20.

The sequence controller 52 may include the gradient magnetic field controller 54 for controlling the gradient amplifier 32, and the RF controller 56 for controlling the RF transmitter 36, the RF receiver 38, and the transmission and reception switch 34. The sequence controller 52 may control the gradient amplifier 32, the RF transmitter 36, the RF receiver 38, and the transmission and reception switch 34 according to a pulse sequence received from the operating unit 60. Here, the pulse sequence includes all information required to control the gradient amplifier 32, the RF transmitter 36, the RF receiver 38, and the transmission and reception switch 34. For example, the pulse sequence may include information about a strength, an application time, and application timing of a pulse signal applied to the gradient coil 24.

The operating unit 60 may request the system controller 50 to transmit pulse sequence information while controlling an overall operation of the MRI system.

The operating unit 60 may include an image processor 62 for receiving and processing the MR signal received by the RF receiver 38, an output unit 64, and an input unit 66.

The image processor 62 may process the MR signal received from the RF receiver 38 so as to generate MR image data of the object 10.

The image processor 62 receives the MR signal received by the RF receiver 38 and performs any one of various signal processes, such as amplification, frequency transformation, phase detection, low frequency amplification, and filtering, on the received MR signal.

The image processor 62 may arrange digital data in a k space (for example, also referred to as a Fourier space or a frequency space) of a memory, and rearrange the digital data into image data via 2D or 3D Fourier transformation.

If needed, the image processor 62 may perform a composition process or difference calculation process on the image data. The composition process may include an addition process on a pixel or a maximum intensity projection (MIP) process. The image processor 62 may store not only the rearranged image data but also image data on which a composition process or a difference calculation process is performed, in a memory (not shown) or an external server.

The image processor 62 may perform any of the signal processes on the MR signal in parallel. For example, the image processor 62 may perform a signal process on a plurality of MR signals received by a multi-channel RF coil in parallel so as to rearrange the plurality of MR signals into image data.

The output unit 64 may output image data generated or rearranged by the image processor 62 to the user. The output unit 64 may also output information required for the user to manipulate the MRI system, such as a user interface (UI), user information, or object information. The output unit 64 may be a speaker, a printer, a cathode-ray tube (CRT) display, a liquid crystal display (LCD), a plasma display panel (PDP), an organic light-emitting device (OLED) display, a field emission display (FED), a light-emitting diode (LED) display, a vacuum fluorescent display (VFD), a digital light processing (DLP) display, a flat panel display (FPD), a 3-dimensional (3D) display, a transparent display, or any one of other various output devices that are well known to one of ordinary skill in the art.

The user may input object information, parameter information, a scan condition, a pulse sequence, or information about image composition or difference calculation by using the input unit 66. The input unit 66 may be a keyboard, a mouse, a track ball, a voice recognizer, a gesture recognizer, a touch screen, or any one of other various input devices that are well known to one of ordinary skill in the art.

The signal transceiver 30, the monitoring unit 40, the system controller 50, and the operating unit 60 are separate components in FIG. 1, but it will be obvious to one of ordinary skill in the art that respective functions of the signal transceiver 30, the monitoring unit 40, the system controller 50, and the operating unit 60 may be performed by another component. For example, the image processor 62 converts the MR signal received from the RF receiver 38 into a digital signal in FIG. 1, but alternatively, the conversion of the MR signal into the digital signal may be performed by the RF receiver 38 or the RF coil 26.

The gantry 20, the RF coil 26, the signal transceiver 30, the monitoring unit 40, the system controller 50, and the operating unit 60 may be connected to each other by wire or wirelessly, and when they are connected wirelessly, the MRI system may further include an apparatus (not shown) for synchronizing clock signals there between. Communication between the gantry 20, the RF coil 26, the signal transceiver 30, the monitoring unit 40, the system controller 50, and the operating unit 60 may be performed by using a high-speed digital interface, such as low voltage differential signaling (LVDS), asynchronous serial communication, such as a universal asynchronous receiver transmitter (UART), a low-delay network protocol, such as error synchronous serial communication or a controller area network (CAN), optical communication, or any of other various communication methods that are well known to one of ordinary skill in the art.

Figure 2:
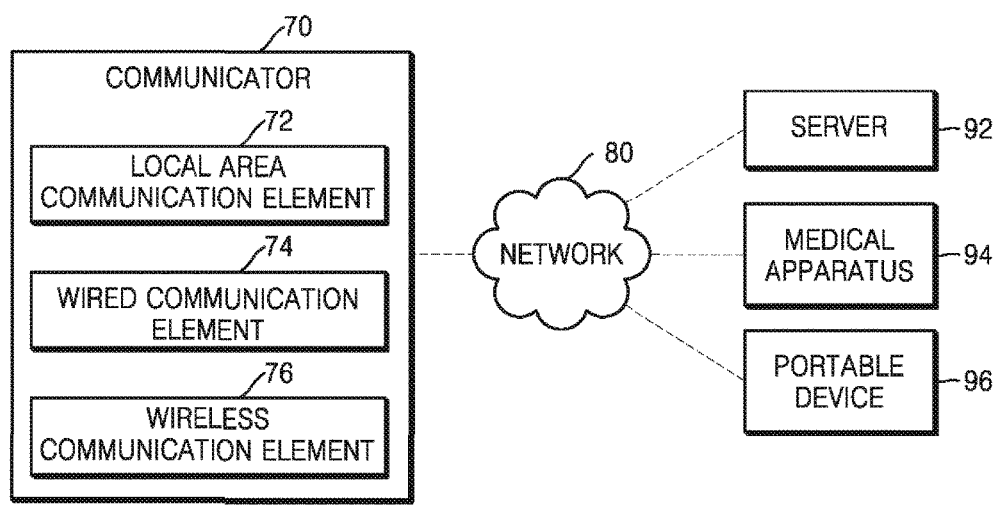
FIG. 2 is a block diagram of a configuration of a communication unit according to an embodiment.

FIG. 2 is a block diagram of a communication unit 70 according to an embodiment of the present disclosure. Referring to FIG. 2, the communication unit 70 may be connected to at least one selected from the gantry 20, the signal transceiver 30, the monitoring unit 40, the system controller 50, or the operating unit 60 of FIG. 1.

The communication unit 70 may transmit and receive data to and from a hospital server or another medical apparatus in a hospital, which is connected through a picture archiving and communication system (PACS), and perform data communication according to the digital imaging and communications in medicine (DICOM) standard.

As shown in FIG. 2, the communication unit 70 may be connected to a network 80 by wire or wirelessly to communicate with a server 92, a medical apparatus 94, or a portable device 96.

In detail, the communication unit 70 may transmit and receive data related to the diagnosis of an object through the network 80, and may also transmit and receive a medical image captured by the medical apparatus 94, such as a CT apparatus, an MM apparatus, or an X-ray apparatus. In addition, the communication unit 70 may receive a diagnosis history or a treatment schedule of the object from the server 92 and use the same to diagnose the object. The communication unit 70 may perform data communication not only with the server 92 or the medical apparatus 94 in a hospital, but also with the portable device 96, such as a mobile phone, a personal digital assistant (PDA), or a laptop of a doctor or patient.

Also, the communication unit 70 may transmit information about a malfunction of the Mill system or about a medical image quality to a user through the network 80, and receive a feedback regarding the information from the user.

The communication unit 70 may include at least one component enabling communication with an external apparatus.

For example, the communication unit 70 may include a local area communication module 72, a wired communication module 74, and a wireless communication module 76. The local area communication module 72 refers to a module for performing local area communication with an apparatus within a predetermined distance. Examples of local area communication technology according to an embodiment of the present disclosure include, but are not limited to, a wireless local area network (LAN), Wi-Fi, Bluetooth, Zig-Bee, Wi-Fi direct (WFD), ultra wideband (UWB), infrared data association (IrDA), Bluetooth low energy (BLE), and near field communication (NFC).

The wired communication module 74 refers to a module for performing communication by using an electric signal or an optical signal. Examples of wired communication technology according to an embodiment of the present disclosure include wired communication techniques using a pair cable, a coaxial cable, and an optical fiber cable, and other well-known wired communication techniques.

The wireless communication module 76 transmits and receives a wireless signal to and from at least one selected from a base station, an external apparatus, or a server in a mobile communication network. Here, the wireless signal may be a voice call signal, a video call signal, or data in any one of various formats according to transmission and reception of a text/multimedia message.

An apparatus for processing an MR image (hereinafter, referred to as an 'MR image processing apparatus') according to an embodiment processes an MR image obtained via an MM apparatus for providing an MR image, such as the MRI system described with reference to FIGS. 1 and 2, and generates an MR image that has undergone motion correction so that the user may easily diagnose a patient disease. In detail, according to an embodiment, the MR image processing apparatus may be included in the MRI system described with reference to FIGS. 1 and 2 to process an MR image.

Furthermore, according to an embodiment, the MR image processing apparatus may receive an MR image from an MRI system externally connected thereto and process the received MR image to obtain a motion-corrected MR image. In detail, according to an embodiment, the MR image processing apparatus may be the server 92, the medical apparatus 94, or the portable device 96 for receiving an MR image via the communication unit 70 of the MM system. In this case, the server 92, the medical apparatus 94, or the portable device 96 may be any electronic device capable of processing and displaying an MR image.

According to an embodiment, the MR image processing apparatus may process time-series MR images (or four-dimensional (4D) MR images) to generate motion-corrected MR images. '4D MR images' may be defined as a plurality of MR images obtained along a time axis in order to detect biological signals that vary over time. Examples of a 4D MRI technique may include functional MM (fMRI), perfusion MRI such as dynamic contrast enhancement (DCE) or dynamic susceptibility contrast (DSC), etc. In addition, diffusion tensor imaging (DTI) images may be obtained by imaging the degree of diffusion in tissue in a plurality of directions, after applying gradients in the plurality of directions. Like in 4D MRI, in DTI, a plurality of volumes may be acquired and used for analysis or diagnosis.

However, in a plurality of MR images captured using various imaging modalities, anatomical positions in volumes may not accurately match each other due to a patient motion. To compensate for the mismatch, motion correction may be performed on an MR image before analysis. Motion correction methods may be classified into a prospective correction method that predicts and corrects for motion during a MM scan and a retrospective correction method that corrects an MR image acquired after an MRI scan. In this case, an image registration technique may be used as a retrospective correction method.

In general, image registration involving iterative optimizations using nonlinear equations requires a long computation time. Furthermore, since 4D MR images generally includes about 30 to about 70 MR images, shortening the motion correction processing time is a helpful factor for efficient image post-processing and diagnosis. To reduce the processing time required for motion correction of a plurality of temporally consecutive MR images, an MR image processing apparatus according to an embodiment performs motion correction on only an MR image corresponding to an interval during which motion is detected from among the plurality of temporally consecutive MR images. Accordingly, the speed at which motion correction is performed may be increased, and usability of MRI in a clinical environment may be improved.

An MR image processing apparatus capable of shortening the processing time required for motion correction according to an embodiment will be described in more detail below with reference to the accompanying drawings.

Figure 3:
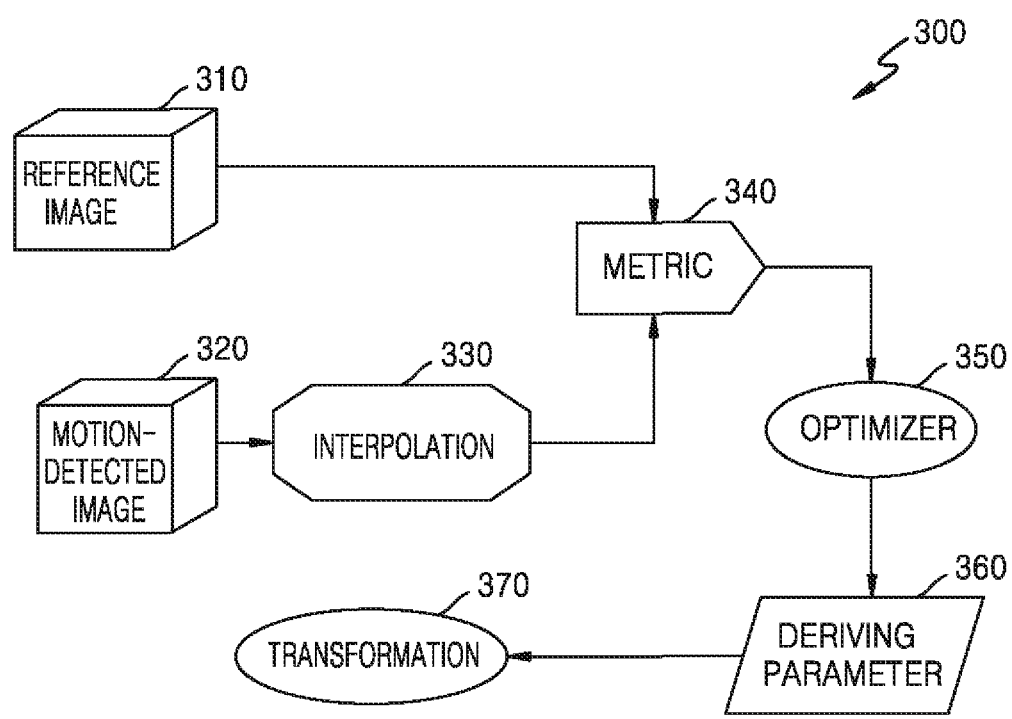
FIG. 3 is a diagram for explaining motion correction performed by an apparatus for processing an MR image.

FIG. 3 is a diagram for explaining motion correction 300 performed by an MR image processing apparatus. FIG. 3 illustrates an example in which image registration is used for motion correction. To perform motion correction on a plurality of MR images, the MR image processing apparatus attempts to find a position in a motion-detected image 320 having a highest similarity with respect to a reference image 310 while repeatedly moving the motion-detected image 320. In detail, interpolation 330 is performed on the motion-detected image 320 in order to reduce motion artifacts therein. A difference between the motion-detected image 320 that underwent the interpolation 330 and the reference image 310 is measured by using a metric 340 for measuring a difference used to register the motion-detected image 320 to the reference image 310. Furthermore, an optimizer 350 may derive a parameter (360) that minimizes the difference between the motion-detected image 320 and the reference image 310. Then, the motion-detected image 320 may be transformed (370) to match the reference image 310 by using the derived parameter.

However, this method involves image registration via optimization, thus requiring a long computation time.

Figure 4:
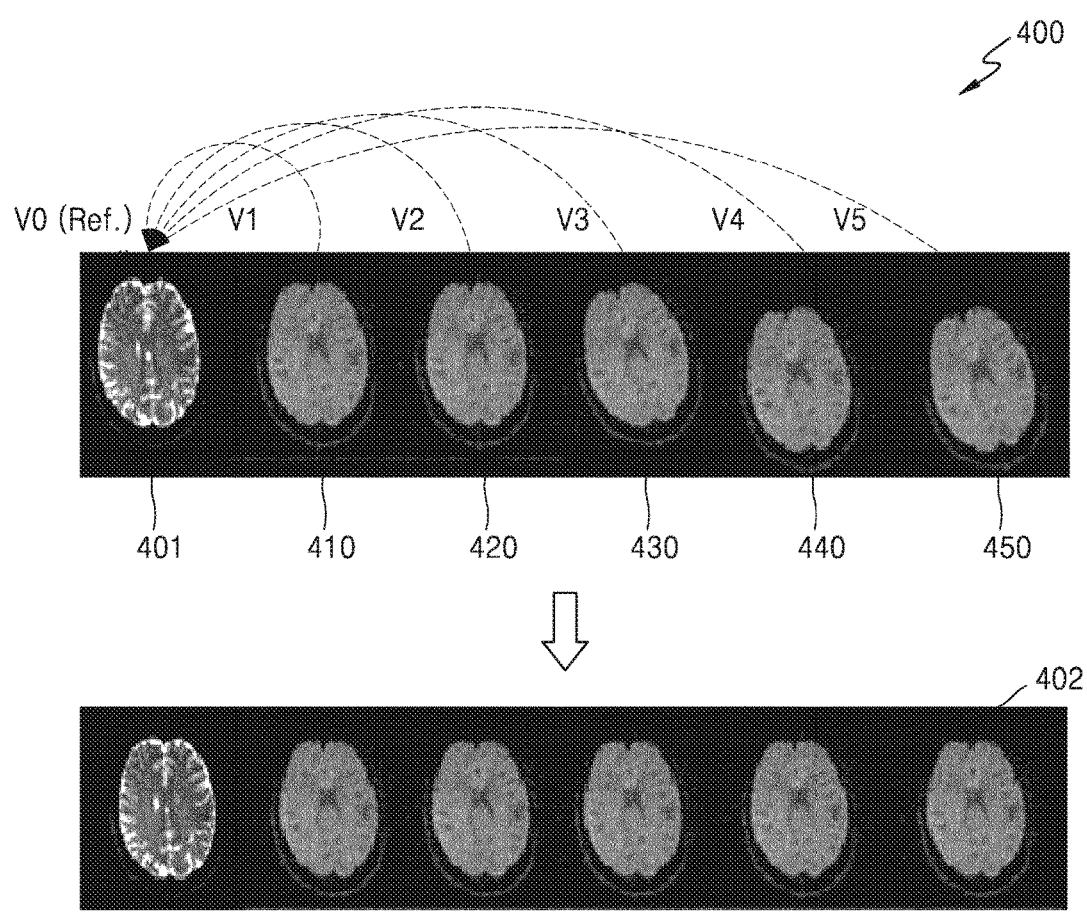
FIG. 4 is a diagram for explaining images output before and after an apparatus for processing an MR image performs motion correction thereon.

FIG. 4 is a diagram for explaining MR images 400 output before and after having undergone motion correction by an MR image processing apparatus. Referring to FIG. 4, in order to apply image registration to 4D MM, the MR image processing apparatus selects a reference MR image (e.g., a first MR image V0 401) for the image registration from among a total number n of MR images. Thereafter, the MR image processing apparatus iteratively registers all the remaining n−1 MR images V1 410, V2 420, V3 430, V4 440, and V5 450 with respect to the reference MR image V0

401 to thereby obtain registered MR images 402. In this case, since 4D MR images (e.g., high-angular resolution diffusion imaging HARDI or DTI images include 30 to more than 256 consecutive MR images along a time axis, it generally takes several minutes to process all MR images.

Patient motion does not always occur during an MM scan. Furthermore, the patient motion does not occur linearly during all time intervals of the MM scan but only intermittently in most cases. In other words, intervals during which a position of a volume changes due to a patient motion may be some of all the time intervals. However, if characteristics of such an intermittent motion are not taken into account, i.e., if intervals during which motion occurs are not distinguished from intervals during which no motion occurs, a significantly long computation time is required since motion correction has to be performed on all MR images.

Figure 5:
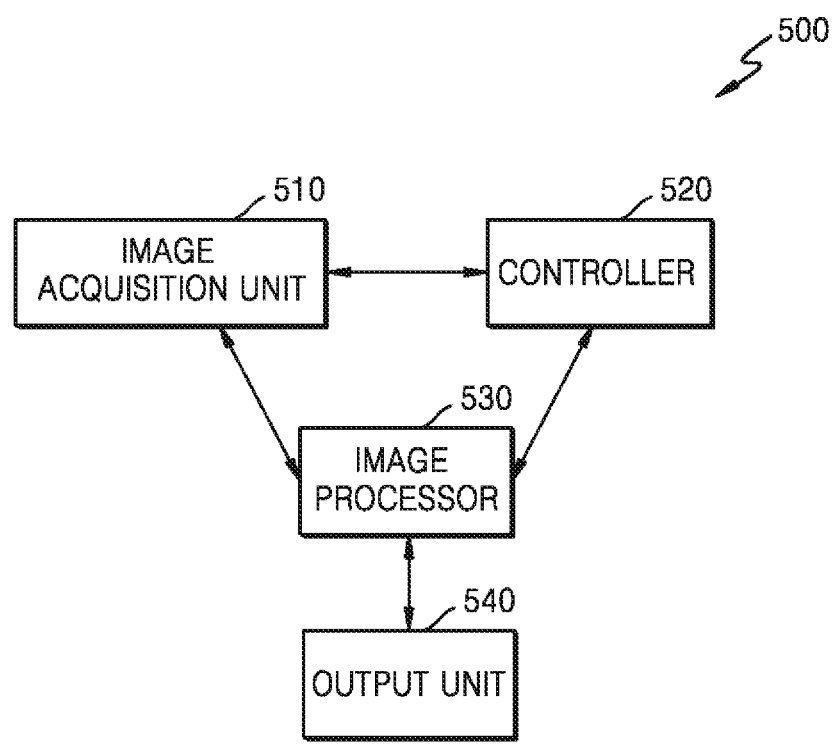
FIG. 5 illustrates an apparatus for processing an MR image according to an embodiment.

FIG. 5 illustrates an MR image processing apparatus 500 according to an embodiment. Referring to FIG. 5, the MR image processing apparatus 500 includes an image acquisition unit 510, a controller 520, an image processor 530, and an output unit 540.

As described above, the MR image processing apparatus 500 may be any image processing apparatus capable of receiving and processing an MR image.

For example, the MR image processing apparatus 500 may be included in the MRI system described with reference to FIG. 1. If the MR image processing apparatus 500 is included in the MRI system of FIG. 1, the image acquisition unit 510, the controller 520, the image processor 530, and the output unit 540 shown in FIG. 5 may be included in the operating unit 60 described with reference to FIG. 1.

The image acquisition unit 510 acquires a plurality of MR images representing an object including at least one target respectively at a plurality of different time points. In detail, when the object including at least one target needs to be observed during consecutive time intervals, the image acquisition unit 510 acquires a plurality of MR images showing the object at different time points, respectively. In this case, the object may be a patient's body part being captured in an MR image, and may be at least one of particular tissue, organ, body part, or region of interest (ROI) to be observed. For example, the object may be a patient's brain, head, abdomen, or chest, and in particular, a metastatic cancer or malignant tumor that requires observation.

For example, the image acquisition unit 510 may acquire a plurality of MR images over time. In detail, the image acquisition unit 510 performs MR imaging of an object at a first time point and a second time point that is subsequent to the first time point, both time points having a specific time interval for observation, to thereby acquire first and second medical images. For example, the image acquisition unit 510 may receive image data for reconstructing the first and second MR images and directly generate the first and second MR images based on the received image data. As another example, the image acquisition unit 510 may receive the first and second MR images. Furthermore, the first and second images may be MR images themselves or multi-dimensional data including image elements (pixel or voxel values) for representing an MR image.

In this case, a mismatch between anatomical positions in a plurality of MR images acquired by the image acquisition unit 510 may occur due to a patient motion. Thus, as described below, the controller 520 may detect an interval during which a patient motion occurs and perform motion correction with respect to the detected interval.

The controller 520 sequentially compares two adjacent MR images from among a plurality of MR images acquired by the image acquisition unit 510 and detects an interval during which motion occurs. Motion detection may be performed in various ways. The controller 520 may detect motion by using a similarity measure between two MR images. In this case, a similarity measure may be computed for at least one of a predetermined volume region, a predetermined planar interval, a predetermined linear interval, and a predetermined point in an MR image. Furthermore, the controller 520 may calculate a difference between centers of mass or centers of intensity of two adjacent MR images in order to detect an interval in which motion occurs and detect the motion based on whether the difference exceeds a reference value. Motion detection performed by the controller 520 will be described in more detail below with reference to FIGS. 7 and 8.

The image processor 530 performs motion correction on at least one MR image from among a plurality of MR images acquired by the image acquisition unit 510 based on an interval in which motion occurs and which is detected by the controller 520 to thereby obtain a corrected MR image. Furthermore, the image processor 530 may generate a diagnostic image consecutively showing a process of change that has occurred in the object on a time axis, so that the user may intuitively determine the degree of change in the object based on the corrected MR image. In this case, the diagnostic image may be a motion-corrected MR image. Since a mismatch between anatomical positions in MR images may occur due to a patient motion during a 4D MRI scan, it may be necessary to generate a diagnostic image that has undergone motion correction such as image registration. Furthermore, the degree of change in the object may indicate whether the object has or has not changed over time. In detail, the diagnostic image shows the degree of change in the object, which is classified into a plurality of stages. Furthermore, if an area or size of the object has changed, the degree of change in the object may indicate whether the area or size of the object has increased or decreased. In addition, if a property of the object has changed without any change in an area or size, the degree of change in the object may indicate the extent to which the property of the target has changed.

The output unit 540 displays a motion-corrected MR image obtained by the image processor 530. Furthermore, the output unit 540 may display at least one of an interval in which motion of the object is detected by the controller 520 and a time point corresponding to an image on which image registration has been performed. FIG. 5 illustrates an example in which the MR image processing apparatus 500 includes the output unit 540. However, the MR image processing apparatus 500 may not include the output unit 540, and in this case, may transmit the motion-corrected MR image to an external display device. Then, a user, e.g., a medical doctor, may visually recognize the motion-corrected MR image via the external display device and examine and diagnose a patient's disease.

Figure 6:
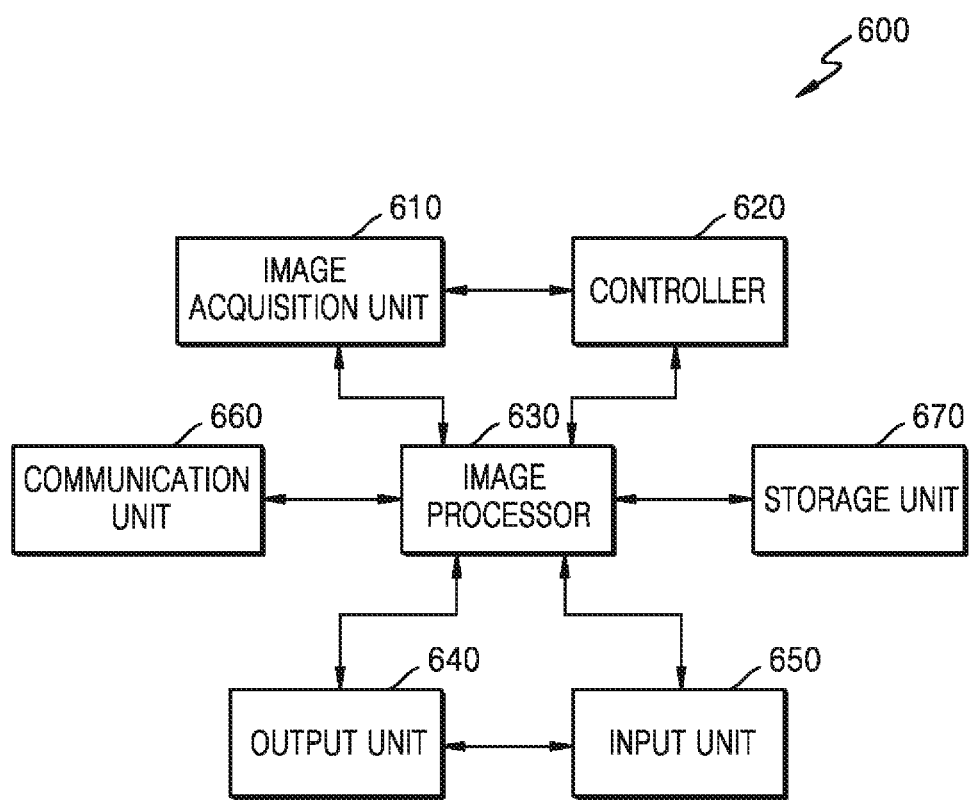
FIG. 6 illustrates an apparatus for processing an MR image according to another embodiment.

FIG. 6 illustrates an MR image processing apparatus 600 according to another embodiment. Since an image acquisition unit 610, a controller 620, an image processor 630, and an output unit 640 shown in FIG. 6 respectively correspond to the image acquisition unit 510, the controller 520, the image processor 530, and the output unit 540 described with reference to FIG. 5, descriptions already provided with reference to FIG. 5 will be omitted below.

Referring to FIG. 6, the MR image processing apparatus 600 according to the present embodiment includes the image acquisition unit 610, the controller 620, the image processor 630, and the output unit 640. Unlike the MR image processing apparatus 500, the MR image processing apparatus 600 may further include at least one of an input unit 650, a communication unit 660, or a storage unit 670. Since the image acquisition unit 610, the controller 620, the image processor 630, and the output unit 640 in the MR image processing apparatus 600 respectively correspond to the image acquisition unit 510, the controller 520, the image processor 530, and the output unit 540 described with reference to FIG. 5, descriptions already provided with reference to FIG. 5 will be omitted below.

Furthermore, when the MR image processing apparatus 600 is included in the MRI system of FIG. 1, the image acquisition unit 610, the controller 620, the image processor 630, the output unit 640, and the input unit 650 in the MR image processing apparatus 600 may have the same functions and configuration as the operating unit 60 of the MM system described with reference to FIG. 1, descriptions already provided with reference to FIG. 1 will be omitted below.

The image acquisition unit 610 acquires a plurality of MR images representing an object including at least one target respectively at a plurality of different time points. It is hereinafter assumed that the image acquisition unit 610 acquires two MR images representing the object at two different time points, respectively.

In detail, the image acquisition unit 610 may obtain a first MR image by performing MR imaging of the object at a first time point and a second MR image by performing MR imaging of the object at a second time point that is subsequent to the first time point. In this case, the first and second MR images may be the same type of MR images acquired by imaging the same object. In detail, the first and second MR images may be obtained by performing MR imaging on the same patient. It is hereinafter assumed that the first and second MR images are obtained by performing MR imaging on the same object.

The controller 620 may sequentially compare two adjacent MR images from among a plurality of MR images acquired by the image acquisition unit 610 and detect an interval in which motion occurs. Motion detection may be performed in various ways. The controller 620 may detect motion by using a similarity measure between two MR images. A similarity measure may be computed for at least one of a predetermined volume region, a predetermined planar interval, a predetermined linear interval, or a predetermined point in an MR image. Furthermore, the controller 620 may calculate a difference between centers of mass or centers of intensity of two adjacent MR images in order to detect an interval in which motion occurs and detect the motion based on whether the difference exceeds a reference value. Motion detection performed by the controller 620 will be described in more detail below with reference to FIGS. 7 and 8.

The image processor 630 obtains a motion-corrected MR image by performing motion correction on at least one MR image from among a plurality of MR images acquired by the image acquisition unit 610 based on an interval in which motion occurs and being detected by the controller 620. In detail, the image processor 630 may generate a diagnostic image consecutively showing a process of change that has occurred in the object on a time axis, so that the user may intuitively determine the degree of change in the object based on the corrected MR image. In this case, the change may include at least one of a change in property of physiological tissue, a position change, a size change, or a shape change that have occurred in the object. For convenience of explanation, the degree to which at least one object has changed during a plurality of time points is hereinafter referred to as "the degree of change."

In detail, the image processor 630 may classify the degree of change in the object into a plurality of stages and generate a diagnostic image showing the plurality of stages in such a manner as to distinguish them from one another. In this case, the plurality of stages may be classified as no change, formation, or destruction.

For example, the image processor 630 may classify the degree of change in the object caused by metastatic cancer into no change, formation, and destruction, and generate a diagnostic image that can visually distinguish no change, formation, and destruction from one another.

Furthermore, the image processor 630 generates a plurality of motion-corrected MR images by performing motion correction on a plurality of MR images. In this case, the motion correction may include image registration. The image processor 630 may also quantify the degree of change as a plurality of stages based on a variation in pixel intensity between the plurality of motion-corrected MR images and generate a diagnostic image showing the quantified plurality of stages in such a manner that they are distinguished from one another. In this case, as described above, the plurality of stages may be classified as no change, formation, or destruction.

Signal intensity on an MR image varies depending on properties of tissue in a medical image. In detail, an intensity value of an MR image is expressed in Hounsfield Units (HU), and black and white on the MR image respectively correspond to −1000 Hu and +1000 Hu. For example, water and air may be defined as 0 HU and 1000 Hu, respectively, and Hu values may increase in the order from air to fat to soft muscle tissue to bone. The image processor 630 may determine whether a change has occurred in the object based on a difference between signal intensity values of motion-corrected MR images. The image processor 630 may also indicate, based on the difference, the quantified plurality of stages in such a manner as to distinguish them from one another. Motion correction performed by the image processor 630 will be described in more detail below with reference to FIGS. 8 and 9.

The output unit 640 displays a predetermined screen. In detail, the output unit 640 may display at least one of a plurality of MR images respectively corresponding to a plurality of time points. Furthermore, the output unit 640 may display a motion-corrected MR image generated by the image processor 630, i.e., a diagnostic image. Furthermore, the output unit 640 may display a screen including a plurality of motion-corrected MR images obtained by performing motion correction on a plurality of MR images.

The output unit 640 may also display a user interface screen. The user may perform setting operations and data entry via the user interface screen output by the output unit 640.

Furthermore, the output unit 640 may be any type of devices that allow the user to visually recognize predetermined data. For example, the output unit 640 may include one of a cathode ray tube (CRT) display, a liquid crystal display (LCD), a plasma display panel (PDP) display, an organic light-emitting diode (OLED) display, a field emission display (FED), an LED display, a vacuum fluorescent display (VFD), a digital light processing (DLP) display, a flat panel display (FPD), a 3D display, a transparent display, etc.

The input unit 650 creates and outputs a user interface screen for receiving a predetermined command or data from a user and receives the predetermined command or data from the user via the user interface screen. The user interface screen output from the input unit 650 may also be output onto the output unit 640 that may in turn display the user interface screen. The user may then view the user interface screen displayed via the output unit 640 to recognize predetermined information and input a predetermined command or data.

For example, input unit 650 may include a mouse, a keyboard, or another input device including hard keys for inputting predetermined data. For example, the user may enter predetermined data or a command by manipulating at least one of the mouse, the keyboard, or the other input device in the input unit 650.

Furthermore, the input unit 650 may be formed as a touch pad. In detail, the input unit 650 includes a touch pad (not shown) combined with a display panel (not shown) in the output unit 640 and outputs a user interface screen onto the display panel. When a predetermined command is input via the user interface screen, the touch pad may detect the input of the predetermined command to recognize the predetermined command input by the user.

In detail, if the input unit 650 is formed as a touch pad, when the user touches a predetermined point on the user interface screen, the input unit 650 detects a touched point. The input unit 650 may then transmit information about the detected touched point to the image processor 630. The image processor 630 may then recognize a user request or command corresponding to a menu item displayed at the detected point and generate a diagnostic image according to the recognized user request or command.

In detail, the input unit 650 may receive information about color mapping that is used to represent the degree of change in a target in a diagnostic image in a distinguishing manner. Furthermore, the input unit 650 may receive a user input for selecting a reference MR image from among a plurality of MR images.

The communication unit 660 may perform communication with an external device, an external medical apparatus, etc. For example, the communication unit 660 may be connected to at least one of external MRI apparatus, medical apparatus, server, or portable device. In detail, the communication unit 660 may be connected to an external MRI apparatus to receive an MR image. Furthermore, since the communication unit 660 may correspond to the communication unit 70 described with reference to FIG. 2, descriptions already provided with reference to FIG. 3 will be omitted below.

In detail, the communication unit 660 may be connected to the network (80 of FIG. 2) by wire or wirelessly to communicate with external devices such as the server (92 of FIG. 2), the medical apparatus (94 of FIG. 2), or the portable device (96 of FIG. 2). The communication unit 660 may exchange data with a hospital server or other medical apparatuses in a hospital connected via a picture archiving and communication system (PACS).

Furthermore, the communication unit 660 may perform data communication with an external device, etc., according to the digital imaging and communications in medicine (DICOM) standard.

The communication unit 660 may transmit and receive data related to diagnosis to an object via the network 80. The communication unit 660 may also receive a plurality of medical images obtained from another medical apparatus (94 of FIG. 2) such as an MRI apparatus, a CT apparatus, an X-ray apparatus, or the like. The image processor 630 may receive the plurality of medical images received via the communication unit 660 and generate a diagnostic image.

Furthermore, the communication unit 660 may receive a diagnosis history or a medical treatment schedule about a patient from the server 92 and may use the diagnosis history or the medical treatment schedule for clinical diagnosis of the patient. Furthermore, the communication unit 660 may perform data communication not only with the server 92 or the medical apparatus 94 in a hospital but also with the portable device 96 of a user or patient.

As described above, the communication unit 660 may receive the plurality of MR images respectively corresponding to the plurality of time points from the server 92 or medical apparatus 94 connected via the network 80 and transmit the received plurality of MR images to the image acquisition unit 610. Furthermore, the communication unit 660 may transmit the diagnostic image generated by the image processor 630 to at least one of the server 92, the medical apparatus 94, or the portable device 96, so that the diagnostic image may be displayed by an external hospital or the like.

The storage unit 670 may store a plurality of MR images respectively corresponding to a plurality of time points. The storage unit 670 may also store various data, programs, etc., necessary for generating a diagnostic image, as well as a final generated diagnostic image. In detail, the storage unit 670 may store the plurality of MR images, and when generation of a diagnostic image is requested via the input unit 650, automatically output the stored plurality of MR images to the image acquisition unit 610.

Furthermore, the storage unit 670 may include at least one storage medium from among a flash memory-type storage medium, a hard disk-type storage medium, a multimedia card micro-type storage medium, card-type memories (e.g., an SD card, an XD memory, etc.), random access memory (RAM), static random access memory (SRAM), read-only memory (ROM), electrically erasable programmable ROM (EEPROM), programmable ROM (PROM), magnetic memory, a magnetic disc, or an optical disc.

Figure 7:
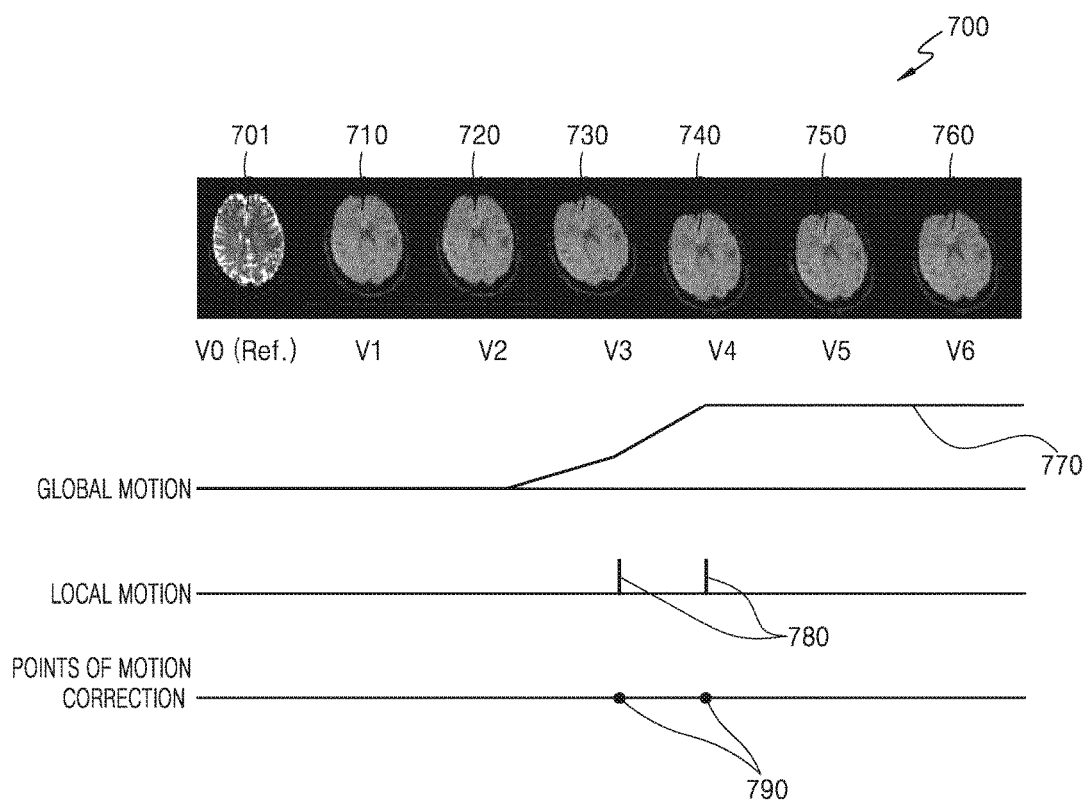
FIG. 7 is a diagram for explaining motion detection performed by an apparatus for processing an MR image, according to an embodiment.

FIG. 7 is a diagram for explaining motion detection 700 performed by the MR image processing apparatus 500 (600), according to an embodiment. FIG. 7 also illustrates a graph 770 schematically showing global motion, a graph 780 schematically showing local motion, and points 790 where motion correction is to be performed.

A patient motion may occur in a discontinuous manner during an MRI scan. In other words, the patient motion does not occur linearly during all time intervals but only intermittently. In this case, since a mismatch between anatomical positions in a plurality of MR images may occur due to a patient motion, motion correction (image registration) needs to be performed on each of the plurality of MR images. An MR image processing apparatus 500 (600) according to an embodiment may perform motion correction on only MR images in which motion is detected, rather than on all MR images, thereby increasing the efficiency of image processing. The MR image processing apparatus 500 (600) may also detect motion that has occurred by sequentially comparing two adjacent MR images from among a plurality of MR images.

According to an embodiment, the MR image processing apparatus 500 (600) acquires a plurality of MR images respectively corresponding to a plurality of time points. Each of the plurality of MR images may be at least one of a 2D MR image and a 3D MR image. For example, as shown in FIG. 7, the plurality of MR images may include temporally consecutive MR Images V0 701, V1 710, V2 720, V3 730, V4 740, V5 750, and V6 760. In this case, MR image V0 701 may be a reference image that is used as a reference in performing motion detection and motion correction of the remaining MR images V1 710, V2 720, V3 730, V4 740, V5 750, and V6 760. Referring to FIG. 7, since a mismatch between anatomical positions occurs in the MR images V3 730 and V4 740, a patient motion may be considered to have occurred at time points corresponding to the MR images V3 730 and V4 740. For example, the MR image processing apparatus 500 (600) may set an interval corresponding to the MR images V3 730 and V4 740, during which motion occurs, as an interval during which motion is detected. Subsequently, the MR image processing apparatus 500 (600) performs motion correction on at least one MR image corresponding to an interval during which motion is detected. For example, the MR image processing apparatus 500 (600) may not perform motion correction on the MR images V1 710 and V2 730 or the MR images V2 730 and V6 760 corresponding to an interval during which no motion is detected. In other words, the MR image processing apparatus 500 (600) does not need to acquire a transformation matrix for performing motion correction on at least one MR image corresponding to an interval during which no motion is detected.

According to an embodiment, the controller 520 (620) may perform motion detection in various ways. The MR image processing apparatus 500 (600) may detect an interval during which motion occurs by using a similarity measure between two MR images. In this case, a similarity measure may be computed for at least one of a predetermined volume region, a predetermined plane interval, a predetermined line interval, or a predetermined point in an MR image. In other words, to improve the speed of motion detection, the MR image processing apparatus 500 (600) may use sub-samples including some regions in the entire MR image instead of the entire MR image. Furthermore, the MR image processing apparatus 500 (600) may detect an interval in which motion occurs by using centers of mass or centers of intensity of two MR images. For example, the MR image processing apparatus 500 (600) may calculate a difference between centers of mass or centers of intensity of two adjacent MR images and determine that motion is detected if the difference exceeds a predetermined reference value.

Figure 8:
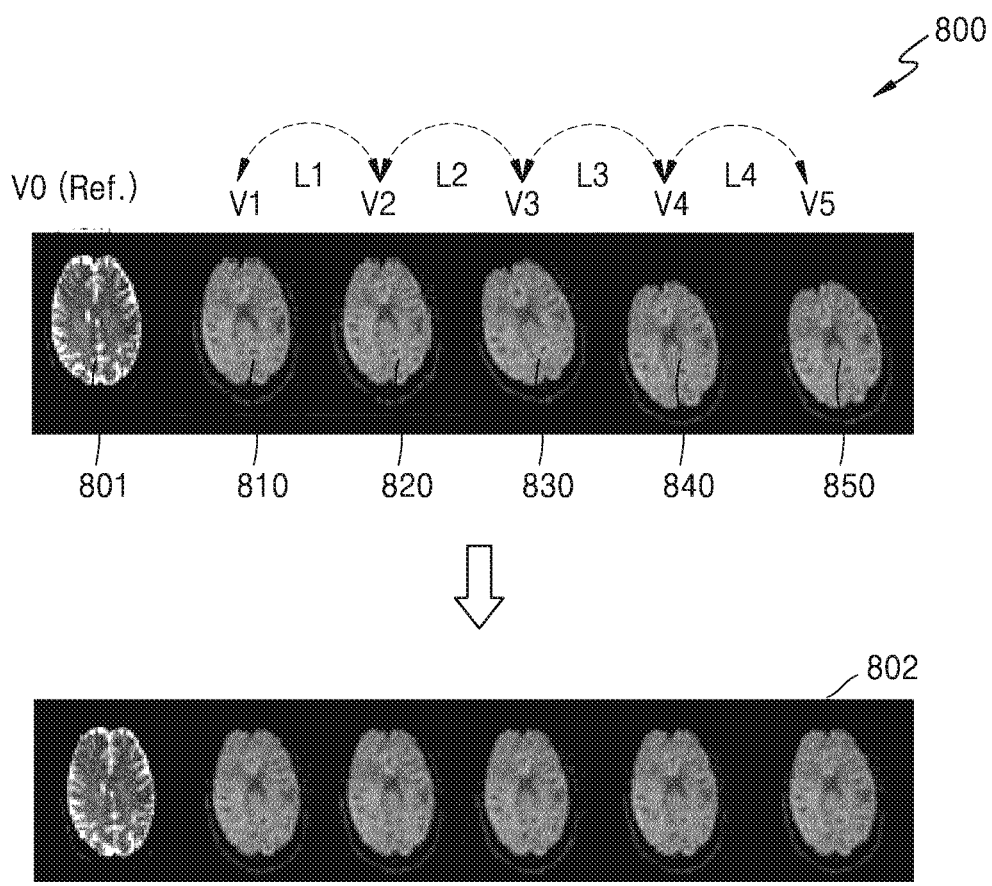
FIG. 8 is a diagram for explaining images output before and after an apparatus for processing an MR image performs motion correction thereon, according to an embodiment.

FIG. 8 is a diagram for explaining images 800 output before and after having undergone motion correction by the MR image processing apparatus 500 (600), according to an embodiment. V0 801, V1 810, V2 820, V3 830, V4 840, and V5 850 respectively denote a plurality of MR images output before having undergone motion correction, e.g., MR images obtained by the image acquisition unit 510 (610) described with reference to FIG. 5 (FIG. 6). Furthermore, motion-corrected MR images 802 obtained by performing motion correction may be images generated by the image processor 530 (630) described with reference to FIG. 5 (FIG. 6).

In FIG. 8, an interval in which motion is detected corresponds to an interval corresponding to MR images V3 830 and V4 840, and the MR image processing apparatus 500 (600) may obtain the motion-corrected MR images 802 by performing motion correction with respect to an interval corresponding to the MR images V3 830 and V4 840. The descriptions with respect to motion detection performed by the MR image processing apparatus 500 (600) in FIG. 8 correspond to the descriptions with respect to motion detection in FIG. 7, and thus, are not repeated.

Figure 9:
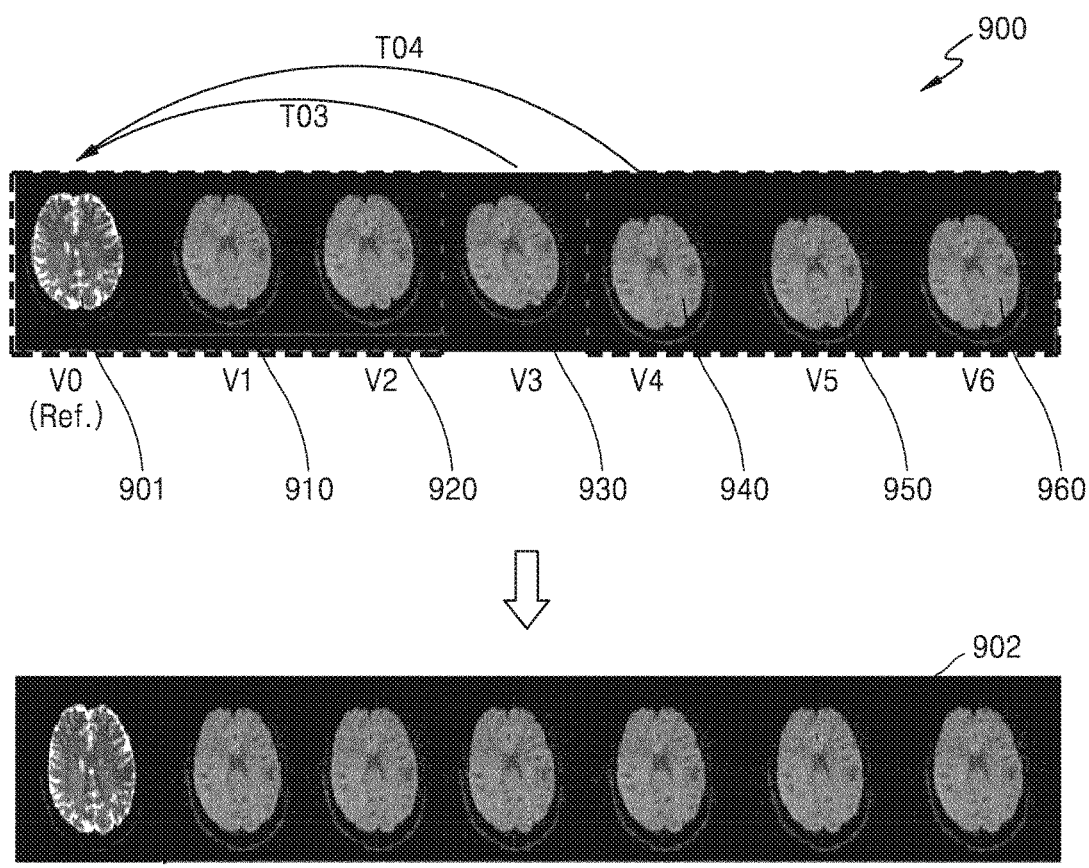
FIG. 9 is a diagram for explaining motion correction performed by an apparatus for processing an MR image, according to an embodiment.

FIG. 9 is a diagram for explaining motion correction 900 performed by the MR image processing apparatus 500 (600), according to an embodiment. When an interval during which motion occurs is detected by the controller 520 (620) of the MR image processing apparatus 500 (600), the image processor 530 (630) may calculate a transformation matrix for performing motion correction on at least one MR image corresponding to the interval during which the motion is detected and obtain a motion-corrected MR image by applying the transformation matrix to the at least one MR image.

Referring to FIG. 9, since an interval during which motion is detected is an interval corresponding to MR images V3 930 and V4 940, the MR image processing apparatus 500 (600) may perform motion correction by comparing the MR image V3 930 or V4 940 to a reference MR image V0 901. Motion correction methods may be classified into a prospective correction method that predicts and corrects for motion during a MRI scan and a retrospective correction method that corrects an MR image acquired after an MM scan. In this case, image registration may be used as a retrospective correction method. Image registration is the process of matching a plurality of images to one another by using a transformation matrix. In detail, the image registration allows a plurality of images to be all represented in the same coordinate system. For example, image registration may be the process of transforming a plurality of MR images V1 910, V2 920, V3 930, V4 940, V5 950, and V6 960 into a single coordinate system. During the image registration, the plurality of MR images V1 910, V2 920, V3 930, V4 940, V5 950, and V6 960 are transformed into the same coordinate system to acquire motion-corrected MR images 902 as shown in FIG. 9. FIG. 9 shows an example in which coordinate systems of the plurality of MR images V1 910, V2 920, V3 930, V4 940, V5 950, and V6 960 are transformed into a coordinate system of the reference MR image V0 901, so that an object in the plurality of MR images V1 910, V2 920, V3 930, V4 940, V5 950, and V6 960 has the same position, size, or view as an object in the reference MR image V0 901.

In detail, the image processor 530 (630) may register at least one MR image corresponding to an interval in which motion is detected by using at least one of rigid registration and non-rigid registration to thereby generate a plurality of motion-corrected MR images. Furthermore, the image processor 530 (630) may measure variations between a plurality of MR images by using various motion measurement techniques such as optical flow, feature matching, etc., and generate a plurality of registered images by using the measured variations. Rigid registration and non-rigid registration performed by the image processor 530 (630) will now be described in more detail.

The image processor 530 (630) may measure global motion of an object in an MR image by using rigid registration. Rigid registration is an algorithm for matching motion such as rotation and translation of an object.

For example, the image processor 530 (630) may set at least one landmark included in the object in each of a plurality of MR images to be registered and transform at least one of the plurality of MR images so as to decrease a distance between corresponding landmarks respectively set in the plurality of MR images. In detail, the image processor 530 (630) obtains a rotation and translation matrix that minimizes the distance between corresponding landmarks respectively set in the plurality of MR images and registers the plurality of MR images together by using the obtained rotation and translation matrix. In this case, the amount of motion estimated based on the rotation and translation matrix may be the amount of motion of the object in the registered MR images.

As another example, the image processor 530 (630) may obtain a rotation and translation matrix based on a pixel intensity similarity between landmarks respectively set in the plurality of MR images to be registered and register the plurality of MR images together by using the obtained rotation and translation matrix. In this case, the pixel intensity similarity may be a sum of square differences (SSD) value. As another example, the pixel intensity similarity may be a sum of absolute differences (SAD) value, a mean of absolute differences (MAD) value, a signal to noise ratio (SNR) value, a mean square error (MSE) value, a peak signal to noise ratio (PSNR) value, or a root mean square error (RMSE) value.

Non-rigid registration is now described. In detail, non-rigid registration is an algorithm for matching states between non-rigid objects. The image processor 530 (630) may measure motion of the object by using non-rigid registration.

For example, the image processor 530 (630) may perform non-rigid registration on the plurality of MR images by using a pixel or voxel based demons algorithm.

In detail, the image processor 630 computes an optimal motion vector between corresponding pixels respectively set in the first and second final target-extracted images. In detail, the image processor 530 (630) sets a plurality of control points on an image grid representing images. Specifically, the image processor 530 (630) sets a plurality of control points respectively in the plurality of MR images and computes an optimal motion vector between set corresponding two control points. In this case, the set corresponding two control points may be extracted based on intensity similarity.

Furthermore, the image processor 530 (630) may perform image registration by using a kernel-based method such as B-spline or thin plate splines. According to the kernel-based method, landmarks are set, and image registration is performed based on an intensity similarity between the set landmarks.

As described above, the image processor 530 (630) may measure the amount of global motion of an object by performing rigid registration on a plurality of MR images while measuring the amount of motion of a region of the object by performing non-rigid registration on the plurality of MR images.

Referring to FIG. 9, the image processor 530 (630) may perform motion correction by registering the MR images with respect to the reference MR image V0 901. In this case, the image processor 530 (630) may perform motion correction by using a transformation matrix that is an operation formula for motion correction. According to an embodiment, to increase the image processing speed, the MR image processing apparatus 500 (600) may perform motion correction selectively on only MR images corresponding to an interval in which motion is detected. In other words, the image processor 530 (630) does not need to derive a transformation matrix for an interval corresponding to the MR images V1 910 and V2 920 or corresponding to the MR images V5 950 and V6 960.

Furthermore, when a first interval and a second interval that is subsequent to the first interval are detected as intervals during which motion occurs, the image processor 530 (630) may set a plurality of MR images corresponding to the first and second intervals as transformation interval images. Furthermore, the image processor 530 (630) may obtain motion-corrected MR images by calculating the same transformation matrix for each of all MR images within the transformation interval images.

For example, referring to FIG. 9, the image processor 530 (630) does not need to calculate a transformation matrix for the MR images V1 910 and V920 in which no motion is detected. However, the image processor 530 (630) calculates V3×T03 and V4×T04 in order to respectively perform motion correction on the MR images V3 930 and V4 940. In this case, T03 represents a transformation matrix for matching coordinate systems of the reference MR image V0 901 and the MR image V3 930 included in the transformation interval images. T04 represents a transformation matrix for matching coordinate systems of the reference MR image V0 901 and the MR image V4 940 included in the transformation interval images.

In addition, for each of the MR images V5 950 and V6 960 in which no motion is detected, the image processor 530 (630) may calculate a transformation matrix T04 between the MR image V4 940 that is a first MR image included in the transformation interval images and the reference MR image V0 901. Thus, the image processor 530 (630) calculates V5×T04 and V6×T04 in order to respectively perform motion correction on the MR images V5 950 and V6 960. In this case, Vn and Tnm represent an n-th MR image among the plurality of MR images and a transformation matrix between MR images Vn and Vm.

In addition, the image processor 530 (630) may set an image interval, other than an interval including transformation interval images from among a plurality of MR images, as a motion free interval. The image processor 530 (630) may not perform motion correction on MR images in a motion free interval.

As described above, by performing motion correction on only MR images included in a transformation image interval in which motion occurs from among a plurality of MR images, the MR image processing apparatus 500 (600) may prevent increases in the computational load and image processing time due to motion correction being performed with respect to all the plurality of MR images.

Furthermore, the image processor 530 (630) may calculate a variation between a plurality of objects based on a plurality of registered MR images. The image processor 530 (630) may then quantify the calculated variation to classify the degree of change into a plurality of stages. Furthermore, the image processor 530 (630) may generate a diagnostic image based on the calculated variation. In detail, the image processor 530 96300 may classify the degree of change into a plurality of stages based on the calculated variation, generate a diagnostic image showing the quantified plurality of stages in such a manner as to distinguish them from one another, and display the generated diagnostic image to the user via the output unit 540 (640).

In detail, when a pixel value in a region in an MR image including an object is compared with a pixel value in a region not including the object, a variation of approximately 0 represents no change in the object, and a variation having a negative (−) or positive (+) value represents occurrence of a change in the object. Thus, the image processor 530 (630) may quantify the variation as three stages, i.e., '0', '−', and '+' and generate a diagnostic image by indicating the three stages in such a manner as to distinguish them from one another.

The user may intuitively determine the degree of change in an object by examining a diagnostic image. In detail, the user may easily determine at a glance whether the object has changed via the diagnostic image, i.e., a motion-corrected MR image.

An operation of performing motion correction by using a transformation matrix will now be described.

Figure 10:
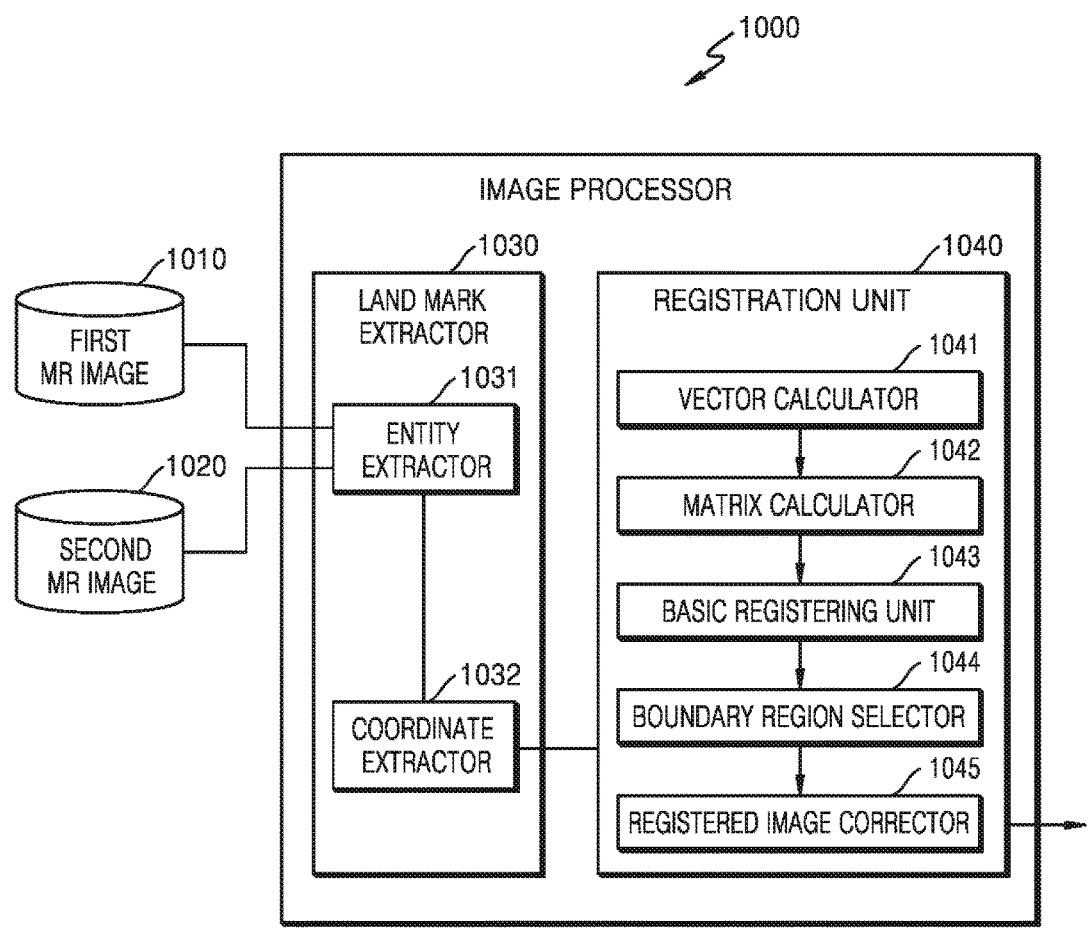
FIG. 10 illustrates an image processor according to an embodiment.

FIG. 10 illustrates an image processor 1000 according to an embodiment.

The image processor 1000 of FIG. 10 may correspond to the image processor 630 described with reference to FIG. 6, and may use a transformation matrix to perform motion correction (e.g., registration). Furthermore, first and second MR images 1010 and 1020 received by the image processor 1000 may be images stored in the storage unit (670 of FIG. 6).

Referring to FIG. 10, the image processor 1000 includes a landmark extractor 1030 and a registration unit 1040. The landmark extractor 1030 includes an entity extractor 1031 and a coordinate extractor 1032, and the registration unit 1040 includes a vector calculator 1041, a matrix calculator 1042, a basic registering unit 1043, a boundary region selector 1044, and a registered image corrector 1045.

Anatomical entities in the first and second MR images that are temporally adjacent may have different displacement values due to a patient's motion or physical activity. In other words, motion may be detected during an interval between the first and second MR images 1010 and 1020.

The landmark extractor 1030 extracts identifiable landmarks in at least one anatomical entity shown in the first and second MR images 1010 and 1020 respectively from the first and second MR images 1010 and 1020. In this case, a landmark refers to a point that is used as a reference for image registration. A point showing distinct anatomical characteristics of an entity may be determined as a landmark. Furthermore, a landmark may be determined as being a highest or lowest point of an entity in which landmarks are to be extracted in a predefined coordinate system.

A 2D landmark may be represented as x- and y-coordinates while a 3D landmark may be represented as x-, y-, and z-coordinates. Thus, coordinates of 3D landmarks may be represented as a vector where n:$x_0$, $x_1$, ... $x_{n-1}$ ndmarks.

The entity extractor 1031 extracts entities that are distinctly identifiable from the first or second MR image 1010 or 1020. The entity extractor 1031 may extract at least two entities.

Extraction of coordinates by the coordinate extractor 1032 is now described. The coordinate extractor 1032 extracts coordinates of landmarks on at least one entity extracted by the entity extractor 1031. The at least one entity extracted by the entity extractor 1031 is a 3D volume, and the coordinate extractor 1032 may limit a region for extracting landmarks in advance and extract coordinates of landmarks. For example, if the entity extractor 1031 extracts a particular region of the brain as an adjacent entity, the coordinate extractor 1032 may limit a region for extracting landmarks so that coordinates of landmarks may be extracted from only the particular region of the brain.

The registration unit 1040 registers the first MR image 1010 and the second MR image 1020 based on geometric shapes of landmarks in the first MR image 1010 and landmarks in the second MR image 1020. In this case, a geometric shape of landmarks may be a direction of a landmark, a distance, an angle and a pixel intensity similarity between landmarks, etc.

The registration unit 1040 includes the vector calculator 1041, the matrix calculator 1042, the basic registering unit 1043, the boundary region selector 1044, and the registered image corrector 1045. The vector calculator 1041, the matrix calculator 1042, and the basic registering unit 1043 quickly performs initial registration on the first and second MR images 1010 and 1020 based on landmarks. Subsequently, the boundary region selector 1044 and the registered image corrector 1045 may correct a result of the registration more precisely based on intensity values of voxels in the first and second MR images 1010 and 1020. Landmark-based registration and voxel intensity-based registration are compared briefly. The landmark-based registration is a technique for registering MR images by comparing common feature points in the MR images. Since the landmark-based registration uses only information about extracted landmarks, this technique requires a small number of calculations and allows fast registration. On the other hand, the voxel intensity-based registration eliminates the need for separate extraction of landmarks but requires arithmetic operations on all voxels for measurement of a similarity measure between MR images. Therefore, this method requires a large number of calculations and a long registration time. However, when initial registration is performed properly, according to this method, the number of calculations required for registration may be reduced, and registration may be performed within a short time. Thus, the registration unit 1040 may correct a result of the initial registration based on intensity values of voxels after performing the initial registration based on landmarks.

The vector calculator 1041 calculates, respectively from the first and second MR images 1010 and 1020, vectors representing a shape of at least one landmark by using coordinates of the at least one landmark selected by the landmark extractor 1030. For example, vectors of coordinates of landmarks calculated from the first or second MR image 1010 or 1020 may be represented as $$x_0, x_1, \ldots x_{n-1}$$

Furthermore, the vector calculator 1041 may calculate vectors respectively from the first and second MR images 1010 and 1020 by using a distance and an angle between landmarks.

The matrix calculator 1042 may calculate a transformation matrix T that matches a vector calculated from the first MR image 1010 and a vector calculated from the second MR image 1020 within a predetermined error range. For example, if vectors respectively calculated from the first and second MR images 1010 and 1020 are $Y_{MR}$ and $X_{US}$, an error may be defined by Equation (1) below:

$$\hat{T} = \underset{T}{\arg\min} \|Y_{MR} - TX_{US}\| \qquad \text{Equation (1)}$$

The matrix calculator 1042 calculates a transformation matrix T that minimizes the error $\hat{T}$ by using Equation (1).

The basic registering unit 1043 matches a coordinate system of the first MR image 1010 and a coordinate system of the second MR image 1020 based on a difference between the vectors $Y_{MR}$ and $X_{US}$ respectively calculated from the first and second MR images 1010 and 1020. The basic registering unit 1043 may enlarge, reduce, or rotate the first or second MR image 1010 or 1020 based on corresponding coordinates in the first and second MR images 1010 and 1020.

The boundary region selector 1044 selects boundary regions with respect to contours of entities respectively in the first and second MR images 1010 and 1020 by analyzing a pattern, i.e., gradient, in which intensity values of voxels increase or decrease. The boundary region selector 1044 may select a region in which a change in intensity values of voxels is greater than or equal to a preset threshold value as a boundary region.

The registered image corrector 1045 corrects the coordinate system of the first or second MR image 1010 or 1020 based on a similarity in a direction in which intensity values of voxels increase or decrease in the boundary regions selected with respect to the contours of the entities.

Figure 11:
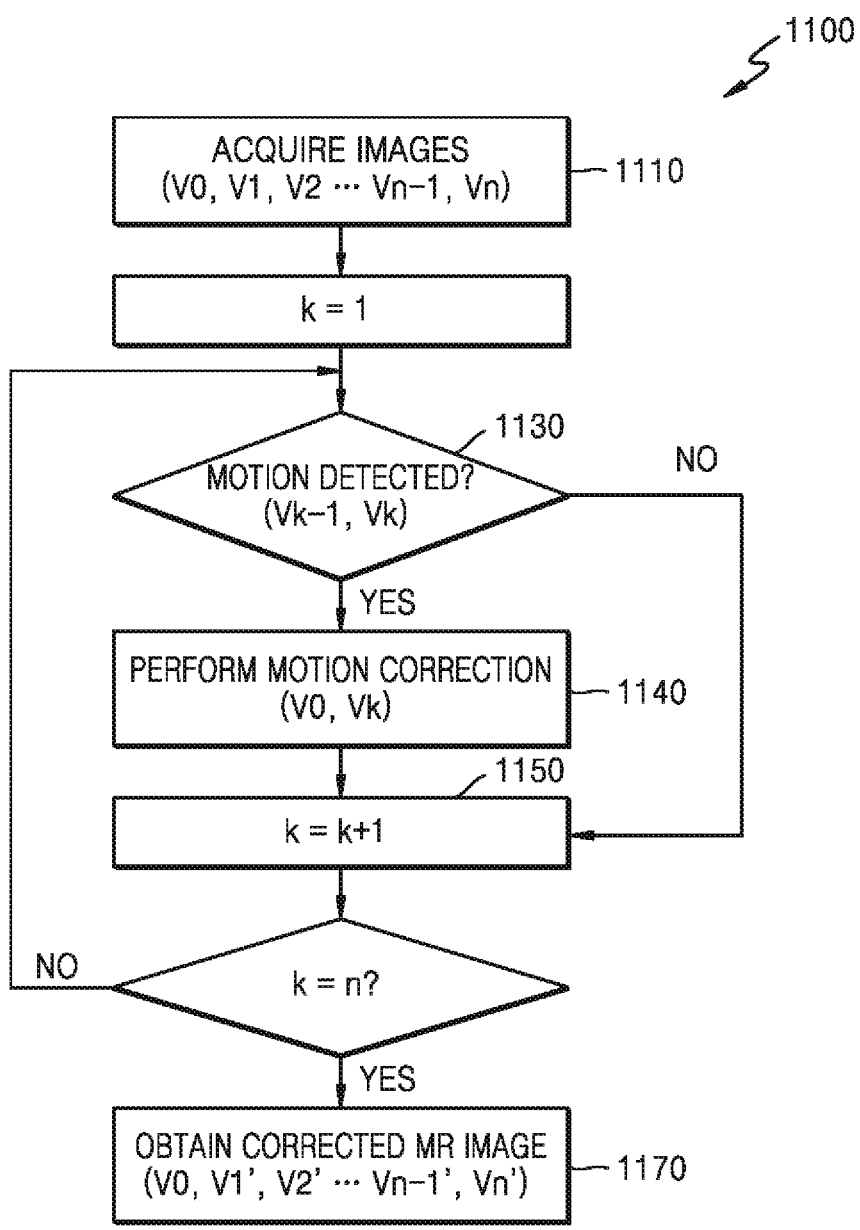
FIG. 11 is a flowchart of an operation of an apparatus for processing an MR image, according to an embodiment.

FIG. 11 is a flowchart of an operation 1100 of the MR image processing apparatus according to an embodiment.

According to an embodiment, the MR image processing apparatus 500 (600) includes components for detecting motion (1130) and components for correcting for the motion (1140). The image acquisition unit 510 (610) may acquire a plurality of MR images (1110), and the controller 520 (620) may detect an interval in which motion occurs by sequentially comparing two adjacent MR images from among the plurality of MR images (1130). In detail, the controller 520 (620) detects an interval in which motion occurs by sequentially comparing two adjacent MR images Vk−1 and Vk from among the plurality of MR images. The comparing may be iteratively performed from a reference MR image V0 that is a temporally earliest among the plurality of MR images to an MR image Vn (1140 and 1150). The image processor 530 (630) may obtain motion-corrected MR images by performing the motion correction (1140) of at least one MR image (e.g., the MR image Vk) corresponding to the interval in which motion occurs with respect to the reference MR image V0 (1170).

Figure 12:
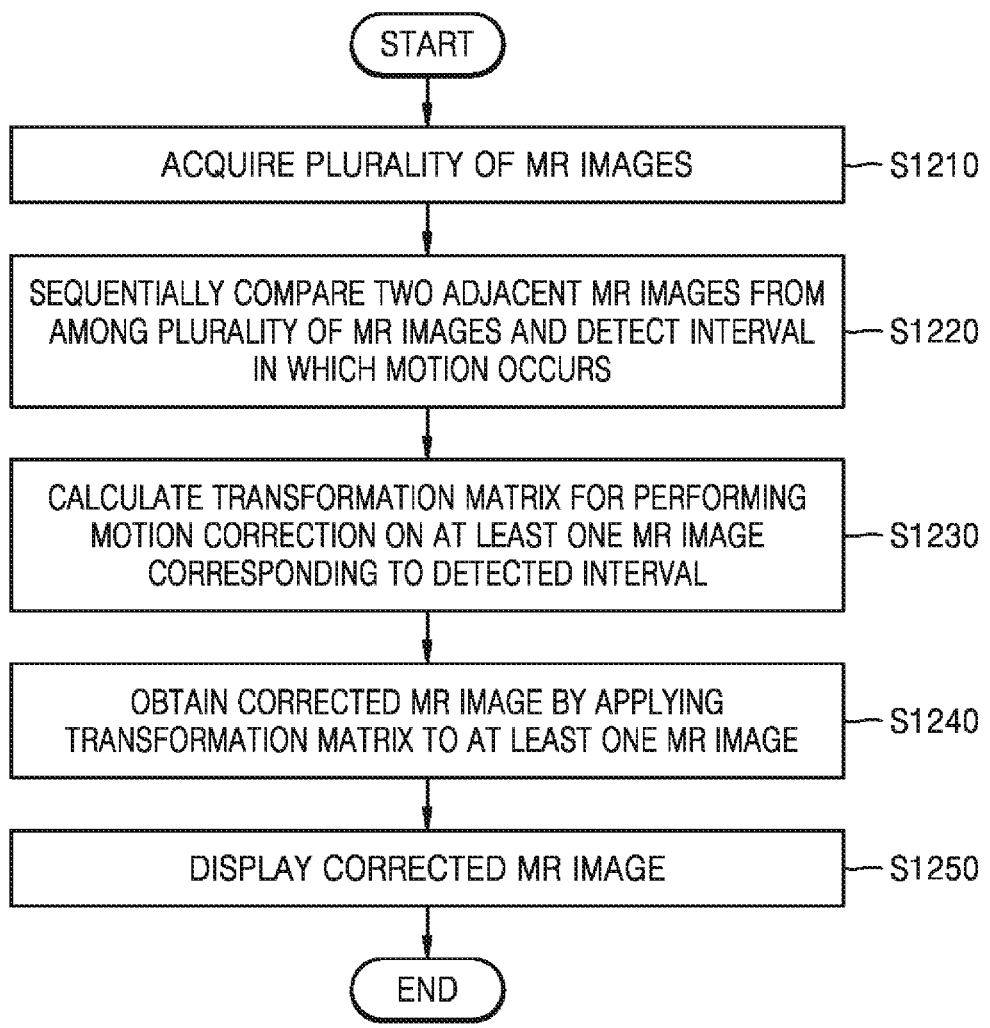
FIG. 12 is a flowchart of a method of processing an MR image, according to an embodiment.

FIG. 12 is a flowchart of a method of processing an MR image according to an embodiment.

The method of processing an MR image according to the present embodiment may include acquiring a plurality of MR images (S1210), detecting an interval in which motion occurs by sequentially comparing two adjacent MR images from among the plurality of MR images (S1220), calculating a transformation matrix for performing motion correction of at least one MR image corresponding to the interval in which motion occurs (S1230), obtaining a motion-corrected MR image by applying the transformation matrix to the at least one MR image (S1240), and displaying the motion-corrected MR image (S1250). According to the method, after first detecting an interval in which motion occurs, motion correction is performed selectively on MR images corresponding to only the detected interval. Thus, the overall image processing speed may be increased.

The above-described embodiments of the present disclosure may be written as computer programs and may be implemented in general-use digital computers that execute program code of the programs using a computer-readable recording medium.

Examples of the computer-readable recording medium include magnetic storage media (e.g., ROM, floppy disks, hard disks, etc.), optical recording media (e.g., CD-ROMs, or DVDs), etc.), and transmission media such as Internet transmission media.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for processing a magnetic resonance (MR) image, the apparatus comprising:
    an image acquisition unit configured to acquire a plurality of MR images by performing MR imaging on a moving object during temporally consecutive time intervals;
    a controller configured to sequentially compare two adjacent MR images from among the plurality of MR images to detect an interval during which motion occurs;
    an image processor configured to calculate a transformation matrix for performing motion correction on at least one MR image corresponding to the detected interval and obtain a motion-corrected MR image by applying the transformation matrix to the at least one MR image; and
    an output unit configured to display the motion-corrected MR image.

2. The apparatus of claim 1, wherein the image processor is further configured to obtain the motion-corrected MR image by performing image registration on two adjacent MR images corresponding to the detected interval from among the plurality of MR images.

3. The apparatus of claim 1, wherein the controller is further configured to detect the motion by using a similarity measure between the two adjacent MR images.

4. The apparatus of claim 3, wherein the similarity measure is calculated for at least one of a predetermined volume region, a predetermined planar interval, a predetermined linear interval, or a predetermined point in each of the two adjacent MR images.

5. The apparatus of claim 1, wherein the controller is further configured to calculate a difference between centers of mass or centers of intensity of the two adjacent MR images and detect the motion based on whether the difference exceeds a predetermined reference value.

6. The apparatus of claim 1, wherein the image processor is further configured to set, when a first interval and a second interval that is subsequent to the first interval are detected as intervals in which the motion occurs, a plurality of MR images corresponding to the first and second intervals as transformation interval images.

7. The apparatus of claim 6, wherein the image processor is further configured to obtain the motion-corrected MR image by calculating a same transformation matrix with respect to each of all MR images within the transformation interval images and applying a same transformation matrix to all the MR images, and
    wherein the transformation matrix is an operation formula for image registration between a reference MR image and a first MR image that is in the transformation interval images.

8. The apparatus of claim 6, wherein the image processor is further configured to set an image interval, excluding intervals including the transformation interval images from among a plurality of MR images, as a motion free interval.

9. The apparatus of claim 8, wherein the image processor is further configured not to perform the motion correction on an MR image within the motion free interval.

10. The apparatus of claim 7, further comprising a user input unit configured to receive a user input for selecting the reference MR image from among the plurality of MR images.

11. The apparatus of claim 1, wherein the output unit is further configured to display at least one of the detected interval and a time point corresponding to an image on which image registration has been performed.

12. A method of processing a magnetic resonance (MR) image, the method comprising:
    acquiring a plurality of MR images by performing MR imaging on a moving object during temporally consecutive time intervals;
    sequentially comparing two adjacent MR images from among the plurality of MR images to detect an interval during which motion occurs;

calculating a transformation matrix for performing motion correction on at least one MR image corresponding to the detected interval;

obtaining a motion-corrected MR image by applying the transformation matrix to the at least one MR image; and displaying the motion-corrected MR image.

13. The method of claim 12, wherein the obtaining of the motion-corrected MR image comprises obtaining the motion-corrected MR image by performing image registration on two adjacent MR images corresponding to the detected interval from among the plurality of MR images.

14. The method of claim 12, wherein the sequentially comparing to detect the interval during which the motion occurs comprises detecting the motion by using a similarity measure between the two adjacent MR images.

15. The method of claim 14, wherein the similarity measure is calculated for at least one of a predetermined volume region, a predetermined planar interval, a predetermined linear interval, or a predetermined point in each of the two adjacent MR images.

16. The method of claim 12, wherein the sequentially comparing to detect the interval during which the motion occurs comprises calculating a difference between centers of mass or centers of intensity of the two adjacent MR images and detecting the motion based on whether the difference exceeds a predetermined reference value.

17. The method of claim 12, wherein the obtaining of the motion-corrected MR image comprises setting, when a first interval and a second interval that is subsequent to the first interval are detected as intervals in which the motion occurs, a plurality of MR images corresponding to the first and second intervals as transformation interval images.

18. The method of claim 17, wherein the obtaining of the motion-corrected MR image comprises obtaining the motion-corrected MR image by calculating a same transformation matrix with respect to each of all MR images within the transformation interval images and applying same transformation matrix to all the MR images, and wherein the transformation matrix is an operation formula for image registration between a reference MR image and a first MR image that is in the transformation interval images.

19. The method of claim 17, wherein the obtaining of the motion-corrected MR image comprises setting an image interval, excluding intervals including the transformation interval images from among a plurality of MR images, as a motion free interval.

20. A non-transitory computer-readable medium method including program code that, when executed by one or more processors, causes a magnetic resonance (MR) image processing apparatus to:

acquire a plurality of MR images from MR imaging performed on a moving object during temporally consecutive time intervals;

sequentially compare two adjacent MR images from among the plurality of MR images to detect an interval during which motion occurs;

calculate a transformation matrix for performing motion correction on at least one MR image corresponding to the detected interval;

obtain a motion-corrected MR image by applying the transformation matrix to the at least one MR image; and output the motion-corrected MR image.

* * * * *